US012771562B2

(12) United States Patent
Woodage et al.

(10) Patent No.: US 12,771,562 B2
(45) **Date of Patent: *Oct. 20, 2026**

(54) SECURE ROOT-OF-TRUST ENROLMENT AND IDENTITY MANAGEMENT OF EMBEDDED DEVICES

(71) Applicant: CRYPTO QUANTIQUE LIMITED, London (GB)

(72) Inventors: Joanne Woodage, London (GB); Kenneth Paterson, London (GB); Shahram Mossayebi, London (GB); John Anthony Elder, London (GB)

(73) Assignee: CRYPTO QUANTIQUE LIMITED, London (GB)

( * ) Notice: Subject to any disclaimer, the term of this patent is extended or adjusted under 35 U.S.C. 154(b) by 344 days.

This patent is subject to a terminal disclaimer.

(21) Appl. No.: 18/553,022

(22) PCT Filed: Apr. 12, 2022

(86) PCT No.: PCT/GB2022/050916

§ 371 (c)(1),
(2) Date: Sep. 28, 2023

(87) PCT Pub. No.: WO2022/219323

PCT Pub. Date: Oct. 20, 2022

(65) Prior Publication Data

US 2024/0380616 A1 Nov. 14, 2024

(30) Foreign Application Priority Data

Apr. 12, 2021 (GB) ..................................... 2105183

(51) Int. Cl.
*H04L 9/32* (2006.01)
*H04L 9/30* (2006.01)

(52) U.S. Cl.
CPC .......... *H04L 9/3278* (2013.01); *H04L 9/3073* (2013.01); *H04L 9/3268* (2013.01)

(58) Field of Classification Search
None
See application file for complete search history.

(56) References Cited

U.S. PATENT DOCUMENTS 8,555,273 B1 10/2013 Chia
8,848,905 B1 * 9/2014 Hamlet ................ H04L 9/3278 726/20

(Continued)

FOREIGN PATENT DOCUMENTS

EP 3850510 B1 12/2023
WO 2011139135 A1 11/2011

OTHER PUBLICATIONS

Mansor et al., Don't Brick Your Car: Firmware Confidentiality and Rollback for Vehicles, 2015 10th International Conference on Availability, Reliability and Security, IEEE, Aug. 24, 2015, pp. 139-148.

(Continued)

*Primary Examiner* — Fatoumata Traore
(74) *Attorney, Agent, or Firm* — Blueshift IP, LLC; Cynthia M. Gilbert

(57) ABSTRACT

Methods, apparatuses, devices and computer readable media are provided in relation to device enrolment. In one example, an electronic device is provided. The electronic device comprises a security module having a physical unclonable function (PUF). The security module is configured to establish an enrolment key pair (EPK, ESK) based on a first challenge and response to the PUF, the enrolment key pair comprising an enrolment public key (EPK) and an enrolment secret key (ESK). The electronic device is configured to establish a device key pair (DPK, DSK) based on a second challenge and response to the PUF, the device key (Continued)

pair comprising a device public key (DPK) and a device secret key (DSK). The electronic device further comprises one or more memories having installed thereon a primary trusted root certificate. The electronic device further comprises one or more processors configured to, over a secure connection, transmit a certificate signing request (CSR) to a server for a certificate certifying that the DPK is associated with a device identifier, the CSR comprising the device identifier and the DPK, wherein the CSR is signed using the DSK and wherein the device identifier is based on a function of the EPK. The one or more processors are further configured to, over the secure connection, receive a device certificate associating the DPK with the device identifier. The one or more processors are further configured to verify that the device certificate is a descendant of the primary trusted root certificate. The one or more processors are further configured to in response to the verification, install the device certificate in memory.

20 Claims, 17 Drawing Sheets

(56) References Cited

U.S. PATENT DOCUMENTS

| | | | | |
|---|---|---|---|---|
| 9,076,004 | B1 | 7/2015 | Bogorad | |
| 9,191,298 | B1 | 11/2015 | Bilby | |
| 10,277,406 | B1 | 4/2019 | Veladanda | |
| 11,882,449 | B1 | 1/2024 | Wan | |
| 2004/0059686 | A1 | 3/2004 | Levesque | |
| 2005/0191990 | A1 | 9/2005 | Willey | |
| 2006/0140399 | A1 | 6/2006 | Young | |
| 2009/0313468 | A1 | 12/2009 | Hazlewood | |
| 2010/0023757 | A1 | 1/2010 | Nguyen-Huu | |
| 2011/0154027 | A1 | 6/2011 | Liu | |
| 2014/0189890 | A1 | 7/2014 | Koeberl | |
| 2015/0095995 | A1 | 4/2015 | Bhalerao | |
| 2018/0018663 | A1 | 1/2018 | Van | |
| 2018/0145991 | A1 | 5/2018 | Mccauley | |
| 2018/0323977 | A1* | 11/2018 | Hojsik | H04L 67/12 |
| 2019/0097818 | A1* | 3/2019 | Lu | H04L 9/3263 |
| 2019/0166117 | A1 | 5/2019 | Kumar | |
| 2019/0238342 | A1 | 8/2019 | Lian | |
| 2020/0159965 | A1 | 5/2020 | Norem | |
| 2020/0195447 | A1 | 6/2020 | Shin | |
| 2020/0259668 | A1 | 8/2020 | Loreskar | |
| 2020/0302047 | A1 | 9/2020 | Falk | |
| 2021/0152545 | A1 | 5/2021 | Park | |
| 2022/0006653 | A1 | 1/2022 | Ghetie | |
| 2022/0131700 | A1* | 4/2022 | Shiner | H04L 9/3278 |
| 2022/0294644 | A1 | 9/2022 | Liu | |
| 2022/0303769 | A1* | 9/2022 | Liu | H04L 9/3268 |
| 2024/0184527 | A1 | 6/2024 | Pearcey | |
| 2024/0187262 | A1 | 6/2024 | Armour | |
| 2024/0195641 | A1 | 6/2024 | Woodage | |
| 2024/0267211 | A1 | 8/2024 | Shingala | |

OTHER PUBLICATIONS

PCT Application No. PCT/GB2022/050910; International Search Report and Written Opinion of the International Searching Authority; Jun. 24, 2022; 11 pages.

PCT Application No. PCT/GB2022/050911; International Search Report and Written Opinion of the International Searching Authority; Jun. 24, 2022; 11 pages.

L. Batina et al., Public-Key Cryptography for RFID-Tags, Proceedings of the Fifth Annual IEEE International Conference on Pervasive Computing and Communications Workshops, Mar. 1, 2007, pp. 217-222, section 3.

Schrijen et al., Secure Device Management for the Internet of Things, Oct. 7, 2019 (Oct. 7, 2019), XP055865750, Retrieved from the Internet: URL:https://www.intrinsic-id.com/wp-content/uploads/2019/05/Secure-Device-Management-for-the-Internet-of-Things.pdf [retrieved on Nov. 25, 2021], sections II, III, figures 1-5.

Garai et al., A scheme of developing frequency encoded tristate logic operations exploiting nonlinear character of PPLN waveguide and RSOA, Science Direct, vol. 122, pp. 498-501, 2011, doi: 10.1016/j.ijleo.2010.03.012.

Mukherjee et al., A method of optical implementation of frequency encoded all optical logic gates based on multiphoton processes in non linear material, Opt Quant Electron, 2010, vol. 42, pp. 121-128, doi: 10.1007/sl 1082-010-9433-8.

Office Action (Final Rejection) dated Apr. 14, 2026 for U.S. Appl. No. 18/553,015 (pp. 1-19).

Office Action (Non-Final Rejection) dated Jun. 13, 2025 for U.S. Appl. No. 18/553,021 (pp. 1-18).

Office Action (Non-Final Rejection) dated Sep. 11, 2025 for U.S. Appl. No. 18/553,015 (pp. 1-16).

Office Action (Notice of Allowance and Fees Due (PTOL-85)) dated Feb. 19, 2026 for U.S. Appl. No. 18/553,021 (pp. 1-10).

Office Action (Notice of Allowance and Fees Due (PTOL-85)) dated Jun. 2, 2026 for U.S. Appl. No. 18/553,021 (pp. 1-7).

Shen et al., All-Optical Full-Adder Based on Cascaded PPLN Waveguides, IEEE Journal of Quantum Electronics, vol. 47, No. 9, Sep. 2011, doi: 10. 1 109/JQE.2011.2161269 (pp. 1-6).

Sisir Kumar Garai, "A Novel All-Optical Frequency-Encoded Method to Develop Arithmetic and Logic Unit (ALU) Using Semiconductor Optical Amplifiers", Journal of Lightwave Technology, IEEE, USA, (Dec. 1, 2011), vol. 29, No. 23, doi:10.1109/JLT.2011.2170209, ISSN 0733-8724, pp. 3506-3514, XP011379226.

Ying Zhoufeng et al, "Electronic-photonic arithmetic logic unit for high-speed computing", Nature Communications, vol. 11, No. 1, doi:10.1038/s41467-020-16057-3, (Dec. 1, 2020), URL: https://www.nature.com/articles/s41467-020-16057-3.pdf, (Jun. 20, 2022), XP055933237 (pp. 1-9).

* cited by examiner

SECURE ROOT-OF-TRUST ENROLMENT AND IDENTITY MANAGEMENT OF EMBEDDED DEVICES

TECHNICAL FIELD

The present disclosure relates generally to methods and systems for establishing trust between parties. In particular, the present disclosure relates to cryptographic methods and the computing apparatuses configured to perform such methods. The disclosure herein is applicable to many devices and networks, but is particularly applicable to internet connected devices.

BACKGROUND

Networks such as the Internet have changed the way that everyday tasks are carried out, and this has had major implications for information security. Many everyday tasks require digital devices to securely authenticate and be authenticated by another party and/or securely handle private information. With the development of the Internet of Things (IoT), it is becoming more common for systems such as heating and lighting to be controlled by internet-connected devices-more and more devices connect to the internet every year.

Device authentication refers to the act of securely establishing the identity of the device to ensure that it can be trusted. A service (for example a cloud-based service) that a device connects to needs to know that the device is genuine, is running trusted software, and is working on behalf of a trusted user.

Provisioning refers to the process of preparing a device to be suitable for handing off to an end user and enrolling with a service. Authentication is part of that process, so that only devices presenting the appropriate credentials are enrolled. The exact details of provisioning can vary widely based on implementation, but in most circumstances a device is provided with cryptographic keys and certificates at the time of manufacture so that when a device is deployed (ready to provide to an end user to connect to a service), it can provide appropriate credentials.

Often, embedded systems in IoT devices rely on pre-shared keys, which become problematic once those devices are connected to the internet and become globally addressable. Pre-shared keys must be shared before deployment of the devices, and as centralized resources typically need to share a key with each device in order to communicate, a single server compromise may jeopardise the security of an entire network of devices. Furthermore, such pre-shared keys do not enable various security guarantees such as proof-of-origin of any communications, and access control.

A public key infrastructure (PKI) offers one way of addressing the problems with pre-shared keys. PKIs are used in many networked systems for centralized credential management and key distribution, although the IoT community has been slow to adopt PKI for both economic and technical reasons. Public key cryptography, or asymmetric cryptography, is a cryptographic system that uses pairs of keys including a public key that can be disseminated widely, and a corresponding secret/private key which is known only to the device/owner. A PKI is a set of roles, policies, hardware, software and procedures needed to create, manage, distribute, use, store and revoke digital certificates and manage public key encryption. A PKI binds public keys with respective identities of entities (such as people, organisations, or individual devices). The binding is established through a process of registration and issuance of certificates by a trusted certificate authority (CA).

In order to take advantage of pre-shared keys or a public key infrastructure, some secret information is typically injected into a secure region of the electronic device at or soon after the time of device manufacture. For example, the secret information may be a pre-shared key, or the secret information may comprise the secret key of a key pair in a system dependent on public key encryption. This approach requires either a secure facility in which to inject the secret information into the electronic device, and/or trust in a third party's ability to inject the keys securely. Secure facilities are costly, difficult to manage, and require ongoing maintenance and evaluation of security procedures to ensure a robust response to new threats. Typically, a hardware security module (HSM) may be required to generate and store the keys, an integrated key injection system may be required to inject a key into an electronic device, and even then if the HSM and/or secure facility is compromised then the integrity of the injected keys cannot be ensured.

The inherent difficulties in securely providing secret information to an electronic device can influence further downstream processes, such as enrolment of the device-its initiation into the grid of interconnected devices. Often, a device certificate, must be securely provided to the device at the time of manufacture, in order to provide the device with some basic credentials with which to enroll with a service. Once again, there are limitations on how securely this may be done.

In a typical scenario, an Original Equipment Manufacturer (OEM) may seek to furnish a manufactured device with an identity to enable enrolment, and to securely install firmware on the device. The device may include, for example, a microcontroller having a secure region for storing keys, and the microcontroller may have been manufactured by a third party manufacturer. The OEM or the manufacturer may, for example, inject a secret key and a device certificate into the secure region, requiring a secure facility. To install firmware/certificates on the device, the OEM may employ the services of a programming house for configuring the devices, which requires trust. The programming house must be trusted to operate a secure facility, to inject the correct information, and to securely sign certificates on behalf of the OEM. In some circumstances, provisioning the devices may require multiple different parties to interact with the electronic device.

It is an object of embodiments of the invention to at least mitigate one or more problems known in the art.

SUMMARY

According to an aspect of the invention, an electronic device is provided. The electronic device comprises a security module having a physical unclonable function (PUF). The security module is configured to establish an enrolment key pair (EPK, ESK) based on a first challenge and response to the PUF, the enrolment key pair comprising an enrolment public key (EPK) and an enrolment secret key (ESK). The electronic device is configured to establish a device key pair (DPK,DSK) based on a second challenge and response to the PUF, the device key pair comprising a device public key (DPK) and a device secret key (DSK). The electronic device further comprises one or more memories having installed thereon a primary trusted root certificate. The electronic device further comprises one or more processors configured to, over a secure connection, transmit a certificate signing request (CSR) to a server for a certificate certifying that the DPK is associated with a device identifier, wherein the CSR comprises the device identifier and the DPK. The CSR is signed using the DSK and the device identifier is based on a function of the EPK. The one or more processors are further configured to, over the secure connection, receive a device certificate associating the DPK with the device identifier. The one or more processors are further configured to verify that the device certificate is a descendant of the primary trusted root certificate. The one or more processors are further configured to in response to the verification, install the device certificate in memory.

Advantageously, the device identifier is associated with a first key pair (EPK and ESK) based on a challenge to and response from the PUF, and the device certificate provided to the electronic device associates a second key pair (DPK, DSK) with that device identifier, the second key pair also based on a challenge to and response from the PUF. No secret information need be injected into the device, and if subsequently the device key pair is compromised, a device certificate can be rekeyed using a new device key pair without the need to also update the identifier of the electronic device.

The one or more processors may be further configured to, over the secure connection, receive an IoT hub root certificate and store the IoT hub root certificate in memory. The one or more processors may be further configured to, over the secure connection, receive an IoT hub endpoint and store the IoT hub endpoint in memory.

The one or more memories may have installed thereon an issuing certificate, wherein the issuing certificate is a descendant of the primary trusted root certificate. Verifying that the device certificate is a descendant of the primary trusted root certificate may comprise verifying that the device certificate is a direct descendant of the issuing certificate. The issuing certificate may be a direct descendant of the primary trusted root certificate.

The one or more memories may have installed thereon a temporary enrolment device certificate, wherein the temporary enrolment device certificate associates the EPK with the device identifier and includes a validity period. The temporary enrolment device certificate may be a descendant of a temporary enrolment trusted root certificate. The secure connection may be established before expiration of the validity period.

Establishing the secure connection to the server may comprise authenticating with the server by presenting the temporary enrolment device certificate.

The temporary enrolment device certificate may be signed by a temporary enrolment issuing certificate stored in the server.

The one or more processors may be further configured to receive a secure connection issuing certificate and a secure connection certificate from the server, the secure connection issuing certificate and secure connection certificate being descendants of the primary trusted root certificate. The one or more processors may be further configured to verify the secure connection certificate using the primary trusted root certificate. The one or more processors may be further configured to, in response to the verification, establish the secure connection to the server.

Verifying the secure connection certificate may comprise verifying the secure connection certificate is a descendant of the primary trusted root certificate and, optionally, comparing the server identity to a server identity stored in the one or more memories of the electronic device.

According to an aspect of the invention, a method is provided, the method for performance by an electronic device. The electronic device comprises a security module having a physical unclonable function. The security module is configured to establish an enrolment key pair (EPK,ESK) based on a first challenge and response to the PUF, the enrolment key pair comprising an enrolment public key (EPK) and an enrolment secret key (ESK). The electronic device further comprises one or more memories having installed thereon a temporary enrolment trusted root certificate. The electronic device is also configured to establish a device key pair (DPK,DSK) based on a second challenge and response to the PUF, the device key pair comprising a device public key (DPK) and a device secret key (DSK). The method comprises, over a secure connection, transmitting a certificate signing request (CSR) to a server for a certificate certifying that the DPK is associated with a device identifier. The CSR comprises the device identifier and the DPK. The CSR is signed using the DSK and the device identifier is based on a function of the EPK. The method further comprises, over the secure connection, receiving a device certificate associating the DPK with the device identifier. The method further comprises verifying that the device certificate is a descendant of the primary trusted root certificate. The method further comprises, in response to the verification, installing the device certificate in memory.

According to an aspect of the invention, a server of a server system comprising one or more servers is provided. The server system is suitable for authenticating an electronic device. The server is configured to receive a certificate signing request (CSR) for a certificate certifying that a device public key (DPK) of a device key pair is associated with a device identifier for identifying an electronic device. The CSR comprises the device identifier and the DPK. The CSR is signed using a device secret key (DSK) of the device key pair, and the device identifier is based on a function of an enrolment key pair known to belong to the electronic device. The server is further configured to cause the device identifier of the CSR to be checked against a database of device identifiers for which the server may sign a certificate. The server is further configured to cause a check of the device identifier of the CSR to be performed to verify that the device identifier is known to identify the electronic device. The server is further configured to sign a device certificate based on the CSR, wherein the device certificate is a descendant of a primary trusted root certificate known to the electronic device. The server is further configured to initiate transmission of the device certificate over a secure connection to the electronic device identified by the device identifier.

The server may be further configured to initiate transmission of a IoT hub root certificate over the secure connection to the electronic device. The server may be further configured to initiate transmission of a IoT hub endpoint over the secure connection to the electronic device.

The server may be further configured to cause the registration of the device certificate to an IoT hub.

The server may be further configured to cause the retrieval of a security policy associated with the device identifier and to cause the signing of the device certificate according to the CSR and security policy.

Causing a check of the device identifier of the CSR to be performed to verify that the device identifier is known to identify the electronic device may comprise verifying that the device identifier of the CSR matches the device identifier of a temporary enrolment device certificate, the temporary enrolment device certificate certifying that the EPK is associated with the device identifier and including a validity period, the temporary enrolment device certificate having been presented by the electronic device to the server system when establishing the secure connection.

The server may be further configured to cause the checking that the temporary enrolment device certificate is signed by a temporary enrolment issuing certificate stored in the server system and the checking that the temporary enrolment device certificate is in the validity period.

The server may be further configured to establish the secure connection between the electronic device and the server system based on the checking of the signature of the temporary enrolment device certificate.

The server may be further configured to initiate transmission of a secure connection issuing certificate and a secure connection certificate from the server system to the electronic device, the secure connection issuing certificate and secure connection certificate being descendants of the primary trusted root certificate.

The server may further be configured to cause the receipt of a temporary enrolment device certificate, the temporary enrolment device certificate certifying that the EPK is associated with the device identifier and including a validity period.

According to an aspect of the invention, a method is provided. The method comprises receiving a certificate signing request (CSR) for a certificate certifying that a device public key (DPK) of a device key pair is associated with a device identifier for identifying an electronic device. The CSR comprises the device identifier and the DPK. The CSR is signed using a device secret key (DSK) of the device key pair, and the device identifier is based on a function of an enrolment key pair known to belong to the electronic device. The method further comprises causing the device identifier to be checked against a database of device identifiers for which the server may sign a certificate. The method further comprises causing a check of the device identifier of the CSR to be performed to verify that the device identifier is known to identify the electronic device. The method further comprises signing a device certificate based on the CSR, wherein the device certificate is a descendant of a primary trusted root certificate known to the electronic device. The method further comprises initiating transmission of the device certificate over a secure connection to the electronic device identified by the device identifier.

According to an aspect of the invention, a system is provided. The system comprises an electronic device and one or more servers. The electronic device comprises a security module having a physical unclonable function (PUF). The security module is configured to establish an enrolment key pair (EPK, ESK) based on a first challenge and response to the PUF, the enrolment key pair comprising an enrolment public key (EPK) and an enrolment secret key (ESK). The electronic device is further configured to establish a device key pair (DPK,DSK) based on a second challenge and response to the PUF, the device key pair comprising a device public key (DPK) and a device secret key (DSK). The electronic device further comprises one or more memories having installed thereon a primary trusted root certificate. The electronic device further comprises one or more processors configured to, over a secure connection, transmit a certificate signing request (CSR) to the one or more servers for a certificate certifying that the DPK is associated with a device identifier. The CSR comprises the device identifier and the DPK. The CSR is signed using the DSK. The device identifier is based on a function of the EPK. The one or more processors are further configured to, over the secure connection, receive a device certificate associating the DPK with the device identifier. The one or more processors are further configured to verify that the device certificate is a descendant of the primary trusted root certificate. The one or more processors are further configured to, in response to the verification, install the device certificate in memory. The one or more servers are configure to receive the CSR over the secure connection from the electronic device. The one or more servers are further configured to check the device identifier against a database of device identifiers for which the server may sign a certificate. The one or more servers are further configured to verify that the device identifier is known to identify the electronic device. The one or more servers are further configured to sign the device certificate based on the CSR, wherein the device certificate is a descendant of the primary trusted root certificate. The one or more servers are further configured to send the device certificate over the secure connection to the electronic device identified by the device identifier.

According to an aspect of the invention, a computer readable medium is provided. The computer readable medium has instructions stored thereon which, when executed by a processor of an electronic device, cause the electronic device to perform a method as described herein.

According to an aspect of the invention, a computer readable medium is provided. The computer readable medium has instructions stored thereon which, when executed by a processor of a server, cause the server to perform a method as described herein.

A computer program and/or the code/instructions for performing such methods as described herein may be provided to an apparatus, such as a computer, on a computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid-state memory, magnetic tape, a removable computer diskette, a random access memory (RAM), a read-only memory (ROM), a rigid magnetic disc, and an optical disk, such as a CD-ROM, CD-R/W or DVD.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments of the invention will now be described, by way of example only, with reference to the accompanying drawings, in which.

Throughout the description and drawings, like reference numerals refer to like parts.

DETAILED DESCRIPTION

Figure 1:
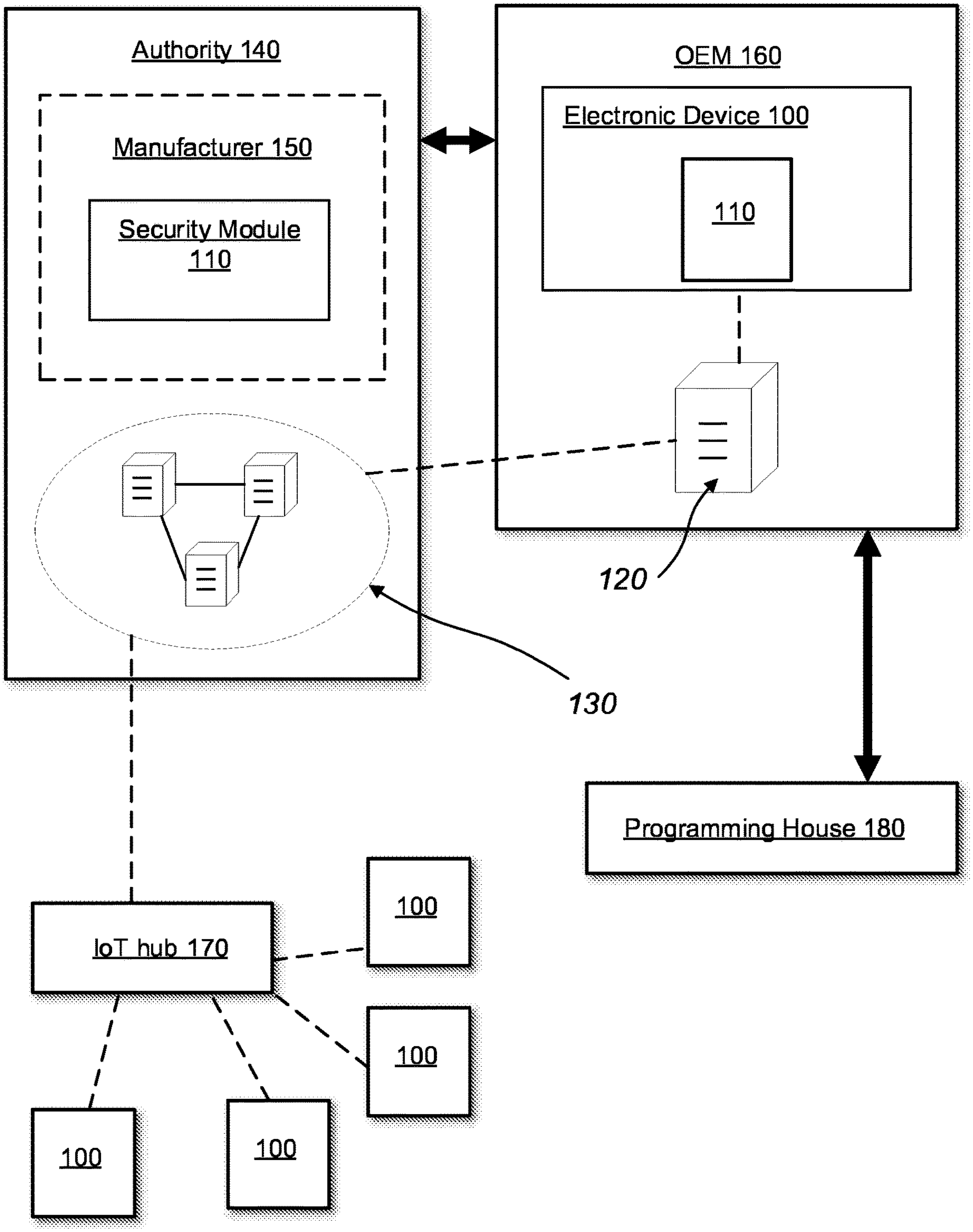
FIG. 1 shows a diagram of various parties that are referred to throughout the detailed description for illustrative purposes only.

Whilst various embodiments are described below, the invention is not limited to these embodiments, and variations of these embodiments may well fall within the scope of the invention which is to be limited only by the appended claims.

In the following, reference is made to the security and enrolment of an IoT device. However, the skilled person would appreciate that the methods, systems, and apparatuses described herein are far more widely applicable.

In what follows, methods of securely providing a temporary enrolment device certificate to an electronic device, and of securely providing a device certificate to an electronic device are described. The methods described herein together enable an electronic device to be deployed, ready to connect to a service (for example a cloud-based service provided by an IoT hub) without the need for the various parties involved to particularly trust one another with the security of the electronic device. For ease of explanation, an example scenario of several interested parties (for example an Original Equipment Manufacturer and an IoT hub) is described in FIG. 1 and referenced throughout the detailed description. However, the methods described herein are applicable more generally, as will be appreciated by the skilled person.

As will be appreciated upon reading the detailed description, an electronic device may be provided with a physical unclonable function. Physical unclonable functions (also known as physically unclonable functions, or PUFs) are a cryptographic primitive used for authentication and secret key storage without the requirement of secure EEPROMs and other expensive hardware. Instead of storing secrets in digital memory, PUFs derive a secret from the unique physical characteristics of one or more components, usually introduced during manufacture. Known PUFs are based on phenomena such as the scattering of laser light through a sheet of hardened epoxy in which tiny silica spheres are suspended, or manufacturing variability in gate delay in some circuits.

In what follows, the terms physically unclonable function, physical unclonable function and PUF are used interchangeably. A PUF comprises an object that performs a functional operation, i.e. when queried with a certain input a PUF produces a measurable output. Typically, an input to a PUF is referred to as a "challenge" and the resultant output of the PUF is referred to as a "response". An applied challenge and its measured response is known as a "challenge-response pair" (CRP). The term "challenge" as used herein is understood to mean the selected input provided to the PUF (for example, the selection of particular cells of an array, the application of a particular voltage, and so on) and the term "response" is used herein to refer to the corresponding output of the PUF.

Any suitable PUF may be used with the systems and methods described herein, provided that the PUF is suitable for use in an electronic device. For example, the PUF may be an SRAM PUF. An SRAM PUF uses the random difference in the SRAMs' threshold voltages to create unique challenge-response pairs.

Another example of a suitable PUF is a delay PUF which exploits random variations in delays in wires or gates on a chip. Given an input challenge, a race condition is set up in the circuit and two transitions that propagate along different paths are compared to see which comes first (the response).

In other examples of a PUF, quantum confinement can play a role. For example, a PUF can be formed from several resonant tunnelling diodes.

In other examples of PUFs, quantum tunnelling through a quantum tunnelling barrier may play a role. One example of a PUF has been described in international patent application number PCT/GB2020/050918 filed on 8 Apr. 2020, entitled "Device Identification With Quantum Tunnelling Currents" and published as WO2020/212689A1. According to an example, a PUF may comprise an array having a plurality of individually addressable cells. Each cell may comprise an elementary circuit having a quantum tunnelling barrier. A cell may comprise a first electronic component in the form of a transistor, and a second electronic component in the form of a second electronic transistor. The source, drain, and body of the first transistor may be held at the same potential (e.g. ground). The source, drain, and body of the second transistor may also all be held at that same potential. The first transistor has a first quantum tunnelling barrier between the channel of the transistor and the gate terminal. The second transistor has a second quantum tunnelling barrier between the channel of the transistor and the gate terminal. Due to inherent differences in the transistors introduced during manufacture, the first quantum tunnelling barrier uniquely characterises the first transistor and the second quantum tunnelling barrier uniquely characterises the second transistor. The cell may be selected using a row decoder and column decoder in order to apply a potential difference across the first quantum tunnelling barrier and the second quantum tunnelling barrier. The potential difference may be below a threshold voltage for which current would classically be able to pass through either the first quantum tunnelling barrier or the second quantum tunnelling barrier. Accordingly, once a cell is selected, a quantum tunnelling current may flow through the first quantum tunnelling barrier of the first transistor and a quantum tunnelling current may flow through the second quantum tunnelling barrier of the second transistor, and classical current may not flow. The quantum tunnelling currents may be compared and amplified. The combination of cells and applied voltages may be considered as a challenge and the output quantum tunnelling currents may be considered as a response.

In other examples, a PUF need not be based on electronic components, so long as it can be interacted with electronically.

In what follows, reference is made to several public key pairs otherwise known as asymmetric key pairs. An asymmetric key pair comprises a public key which may be shared with other parties, and a corresponding secret key which is not shared. The public key is a public value that does not need to be kept secret but should be stored so that it cannot be tampered with. In an example, the public key may be stored in ROM in the electronic device to ensure it cannot be rewritten or modified in any way. The public key pairs described herein often have names. For example, one public key pair is described as an "enrolment public key pair" comprising an "enrolment public key" (EPK) and a corresponding "enrolment secret key" (ESK). Another public key pair is described as a "device public key pair" comprising a "device public key" (DPK) and a corresponding "device secret key" (DSK). Another public key pair is described as an "authority key pair" comprising a "public authority key" (PAK) and a corresponding "secret authority key" (SAK). The reader will appreciate that the names of these public key pairs are intended only to differentiate between the public key pairs.

The public key pairs described herein may be used in conjunction with any suitable public key cryptosystem, for example RSA or an elliptic curve based cryptographic system. Many of the public key pairs described herein are for use with digital signatures. A digital signature is a mathematical scheme for verifying the authenticity of digital messages or documents. In the examples herein, any suitable digital signature scheme may be used, for example RSA, ElGamal signature scheme or ECDSA.

Several of the severs/server systems/computing apparatuses described herein have also been given names such as "authority server system" or "key management server". The reader will appreciate that such names are intended only to differentiate between the different computing apparatuses.

FIG. 1 shows an illustration depicting the commercial (or otherwise) parties that may be engaged in the secure creation, provisioning and deployment of an electronic device 100. The skilled person would appreciate that other set-ups are envisaged and this figure is provided for illustrative purposes only. At a high level, a security module is manufactured and then provided (typically, but not necessarily, as part of a microcontroller) to an original equipment manufacturer (OEM) 160 for installation in an electronic device 100. The OEM 160 then, with the aid of a programming house 180, may take steps to install firmware on the electronic device 100 and ultimately prepare the electronic device 100 for deployment. Once deployed, the electronic device 100 may communicate with a service provided through an IoT hub 170.

Referring to the figure, an authority 140 may have manufacturing capabilities 150 (or may work closely with a trusted manufacturer) to create security modules 110 for installation in an electronic device 100. Examples of security modules and electronic devices are described further below.

For the purposes of the present discussion, a security module 110 includes a physical unclonable function (PUF), not shown in FIG. 1, which is operable to establish public key pairs. A public key pair comprises a public key which may be shared with other parties, and a corresponding secret key which is not shared. A public key pair may also be known as an asymmetric key pair. A public key and a secret key may be based on a challenge and response to the PUF. For example, a public key may be based on a challenge to the PUF, and a secret key may be based on a response to that challenge. Accordingly, the security module 110 is able to establish public key pairs without requiring any secret keys to be injected therein by either the manufacturer 150 or any parties downstream.

For the purposes of the present discussion the security module 110 is configured to establish at least two key pairs based on a corresponding at least two challenge-response pairs. Advantageously, with PUF-based public key pairs, the secret keys do not need to be stored on the electronic device but can be dynamically regenerated from the PUF within the secure perimeter/trust zone provided by the security module. Accordingly, even if the electronic device is hacked, there may be no secret key stored there to be stolen.

An enrolment public key (EPK) and corresponding enrolment secret key (ESK) are based on a first CRP. The EPK is used to provide an identifier for the electronic device and, as set out further below, is used in a process for providing a temporary enrolment device certificate to the electronic device. The temporary enrolment device certificate associates the EPK with the device identifier and is usable in a subsequent communication to obtain a device certificate for the electronic device. The device identifier is based on a function of the EPK. While in many of the examples described herein, the function is a cryptographic hash function, this need not be the case and another function may be used.

A device public key (DPK) and a corresponding device secret key (DSK) are based on a second CRP. The device key pair is used in providing a device certificate to an appropriate electronic device having a particular device identifier based on the EPK. The device certificate certifies that the DPK is associated with the device identifier. As will be described below, the chain of trust that certifies the device certificate is controlled by the OEM 160.

For the purposes of the present disclosure, an electronic device 100 may be understood to consist of low level circuitry, such as a microcontroller (MCU). An electronic device 100 may alternatively be understood to comprise higher level circuitry, for example circuitry for sensing humidity or temperature, or may be understood to be a larger scale electronic device such as a smart phone or computer. The manufacturer 150 may manufacture just the security modules 110 or may manufacture a microcontroller having the security module 110 installed therein.

As will be explained further below, the authority 140 may be associated with a public key pair. That is, the authority 140 may be associated with a public key (hereafter referred to as the public authority key, PAK) and a corresponding secret key (hereafter referred to as the secret authority key, SAK). The SAK is not shared with any other party, while the PAK may be shared more widely. For example, the PAK may be imprinted in the security module 110, for example in secure memory. Alternatively, if the manufacturer 150 manufactures microcontrollers (or other electronic devices) comprising the security modules, the PAK may be installed in other read only memory (ROM) of the electronic device, external to the security module. For security purposes, it is important that the PAK stored on the security module/electronic device cannot be rewritten or modified in order to preserve its integrity. The PAK may be used by the security module 110 at a later stage to verify that information received has been signed using the SAK and thus has been approved by the authority 140. Other non-secret information may also be imprinted in the security module/electronic device, for example a root certificate signed by the authority 140 using the SAK and indicating that the PAK is associated with the authority 140. No secret information is provided to the security module 110 by the authority 140. No secret information is extracted from the security module 110 by the authority 140 or manufacturer 150.

Initial enrolment firmware (IEF) is also provided to the security module/electronic device for enabling a device identifier and one or more public keys to be extracted from the security module 110.

The authority 140 may own and/or operate a server system 130 comprising one or more servers. While the authority server system 130 of FIG. 1 has been shown with three servers, the skilled person would appreciate that the server system 130 may comprise more or fewer servers.

At least one of the servers of the authority system is configured to sign certificates using the SAK (more information on this is provided further below). The SAK can also be used to sign firmware.

At least one of the servers of the authority server system 130 is configured to hold a database having information on the security modules 110 such as a device identifier.

At least one of the servers of the authority server system 130 is configured to communicate securely with a computing device 120 operated by an original equipment manufacturer (OEM) 160.

At least one of the servers is configured to communicate with an IoT hub 170. An IoT Hub is a managed service, hosted in the cloud, that acts as a message hub for bi-directional communication between an IoT application and the electronic devices it manages. For the purposes of the present discussion, the methods described herein are suitable for provisioning an electronic device so that it may be deployed ready to communicate with an IoT hub 170.

For clarity purpose only, a server of the server system 130 is sometimes referred to herein as an "authority server".

The skilled person would appreciate that at least some of the functionality of the server system 130 may be provided as a cloud service. One or more of the servers may be located physically external to the authority 140. An authority server of the server system 130 may receive a device identifier for identifying a particular security module 110. The device identifier is based on a function of an enrolment public key (EPK) of an enrolment key pair comprising an enrolment secret key (ESK) and the EPK. The EPK and ESK are based on a challenge and response to the PUF of the security module 110 and the ESK does not leave the security module 110. In an example, the EPK is based on a challenge to the PUF, and the ESK is based on a response to the challenge to the PUF. The server system 130 is configured to store the device identifier in a database. In some examples, the server system 130 may also, but is not required to, receive the EPK for the particular security module 110.

Once the server system 130 has received and stored the device identifier of the security module 110, the security module 110 (possibly already installed in a microcontroller) is provided to the OEM 160. The OEM may typically purchase a batch of such security modules for installation in several electronic devices 100 being manufactured by the OEM 160.

The OEM 160 also has access to a computing apparatus 120 capable of securely communicating with the server system 130 of the authority 140. For ease of reference, the computing apparatus 120 operated by the OEM is referred to as a "key management server" in what follows. While the term "key management server" is used in the singular, the skilled person will appreciate that the functionality of the computing apparatus 120 may be shared among a plurality of computing devices and so "key management server" should be understood to also refer to multiple computing devices (a key management server system comprising one or more servers/computing devices) having the desired functionality.

The key management server 120, hereafter referred to as a KMS 120, may be thought of in some situations as another authority server of the authority server system 130, albeit a server with which the OEM 160 is able to interact directly. In particular, the KMS 120 is capable of secure communication with the authority server system 130, and so may be certified for the OEM's use by the authority 140.

The key management server 120 may comprise a physical server provided to the OEM 160 for on-premises operation. For example, the OEM 160 may arrange to obtain a physical KMS 120 from the authority 140. The authority 140 may generate and record a KMS identifier for identifying the particular KMS instance to be provided to the OEM 160. The authority 140 may generate a KMS public key pair in a hardware security module (HSM) inside the KMS 120, extract the KMS public key of the KMS public key pair, sign a certificate using the SAK to associate the KMS identifier with the KMS public key, and embed the certificate in the KMS software. The authority 140 may also embed in the KMS 120 a root certificate associating the PAK with the authority 140, along with a URL that will enable the KMS to connect with an authority server of the authority server system 130. The physical KMS 120 may then be physically transferred to the OEM 160. The KMS 120 may subsequently initiate a secure communication (for example, a TLS communication) with the server system 130. The server system 130 may authenticate by presenting a TLS certificate and chain signed by the SAK and performing TLS server authentication. The KMS 120 can then verify the certificate using the hardcoded root certificate associating the PAK with the authority 140. The KMS 120 can authenticate to the authority server by presenting its certificate (signed using the SAK by the authority 140) and performing TLS client authentication. The authority 140 can verify the signature over the certificate using the root public key (PAK) that corresponds to the SAK used to sign the certificate installed in the KMS. The skilled person would appreciate that the public authority key used to certify the KMS 120 may be the same or different to the public authority key installed into the security modules 110.

As opposed to a bespoke physical server provided to the OEM 160 for on-premises operation, the key management server 120 may comprise computing apparatus 120 operated by the OEM 160 but having bespoke software for a secure gateway provided thereon for communicating with the server system 130 of the authority 140. The bespoke software is agnostic for ease of deployment and can be easily installed and operated by OEM 160. The bespoke software includes a mechanism (public key) whereby it can authenticate to the server system 130.

The key management server 120 is capable of communicating with one more electronic devices 100 also. In this way the one or more electronic devices 100 may be enrolled. The KMS 120 may be used to facilitate the secure installation of firmware on an electronic device 100. As will be described further below, the KMS 120 may be used to associate device identifiers with specific electronic devices 100. The KMS 120 may be used to sign certificates.

The OEM 160 may use the KMS 120 to register one or more received security modules. Specifically, the KMS 120 may communicate with the security module 110 of an electronic device to extract a device identifier, the device identifier comprising a function of the EPK. The KMS 120 may open a secure communication channel with the authority server system 130 to register with the trusted authority 140 an association between the KMS instance 120 and the device identifier. The authority 140 may update a local database and inform the KMS 120 that it has successfully registered the device identifier, and may grant the KMS 120 certain permissions to communicate with the electronic device associated with that device identifier.

The OEM 160 may use the KMS 120 to securely provide firmware to an electronic device. The OEM's firmware may be installed upon the electronic device using any suitable secure method. For example, the OEM 160 may design firmware to be installed upon the electronic device 100. The KMS 120 may open up a secure communication channel with the authority server system 130 and transmit the firmware or a hash thereof to the authority 140 for signing with the secret authority key SAK, the counterpart of which (PAK) is installed upon the electronic device 100. The KMS 120 may further encrypt the firmware and the authority's signature with a PUF-based firmware public key (FPK), the counterpart of which is dynamically generatable in the electronic device. The electronic device may accordingly decrypt the firmware using the corresponding firmware secret key and verify that the firmware has been signed by the authority 140 using the PAK stored in memory. In this way, the OEM can securely provide firmware to the electronic device 100.

The firmware may include low level instructions for controlling the hardware of the electronic device.

The firmware may include one or more root certificates for enrolling the device as per the methods described further below. In particular, the firmware may include a primary trusted root certificate ("OEM_ROOT", FIG. 6C).

The firmware may include an identifier of the KMS 120 with which the device identifier of the electronic device is registered. For example, the identifier may comprise a Uniform Resource Locator (URL) with which the electronic device is to communicate to contact the KMS 120. The firmware may comprise instructions for initiating a secure connection such as a TLS connection with the computing apparatus/server identified by the URL.

The firmware may include details of a certificate naming structure, such that the electronic device is able to interpret received certificates. The firmware may further comprise details for establishing a certificate signing request (CSR). A certificate signing request usually contains the public key for which the certificate should be issued, identifying information (such as a device identifier) and integrity protection (e.g., a digital signature).

The KMS 120 may also be used to securely provide the electronic device with the required information for connecting to an IoT hub 170. For example, the KMS 120 may be configured to communicate with an IoT hub, directly or via the server system 130, to provide device certificates for each enrolled electronic device 100 to the IoT hub. The KMS 120 may be configured to provide an IoT root certificate and an IoT endpoint to the electronic device(s) 100 to enable the device to communicate with the IoT hub 170.

The electronic devices 100 may thus be deployed with all of the information they require to communicate with the IoT hub 170.

Figure 2:
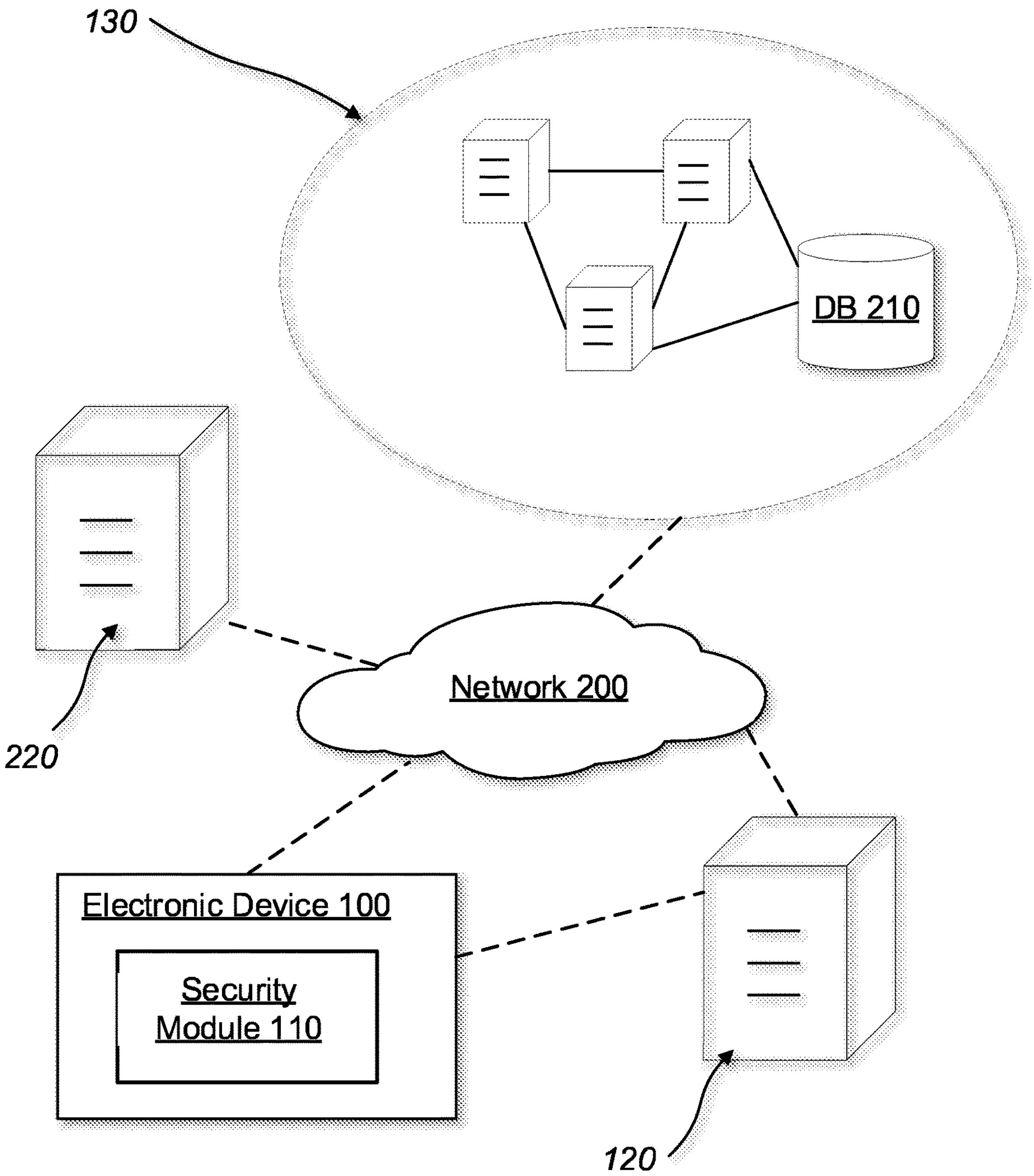
FIG. 2 shows a communication system.

FIG. 2 shows more generally a communication system including many of the hardware devices present in FIG. 1. FIG. 2 in particular shows a communication network 200, an example electronic device 100 having a security module 110, a key management server 120 that may be operated by for example an OEM 160, an authority server system 130, and a computing device 220 that may be operated by, for example, an IoT hub 170. Communication network 200 may be any suitable communication network, such as the Internet. In some examples, the network 200 may comprise a Wide Area Network (WAN).

The electronic device 100 may take any suitable form and may comprise any suitable computing apparatus for performing a method as described herein. For example, the electronic device may be any computing device capable of processing and storage such as a personal computer, a server, a laptop computer, or other such machine. The electronic device 100 may comprise an IoT device. The electronic device may comprise a microcontroller unit (MCU) for installation in a larger device. The electronic device 100 may communicate with other devices directly or via the network 200. For example, the electronic device 100 may communicate with the KMS 120 either via a physical connection or via the network 200. Once the electronic device 100 is deployed, the device 100 may communicate with the computing device 220 over the network 200. The electronic device may communicate with the KMS 120 and/or the computing device 220 over a secure connection, for example a TLS connection.

A KMS 120 may comprise any suitable computing apparatus, such as the computing apparatus 500 discussed further below. A KMS 120 may comprise a cluster of servers or a single device. The functionality of the KMS 120 may be utilized in many different types of data processing environments including a distributed data processing environment, a single data processing device, or the like.

The KMS 120 is able to establish a secure connection with the authority server system 130 via the network 200, and is also able to communicate with the electronic device 100 via the network 200 or, in some circumstances, via a direct connection such as a wired connection. The KMS 120 is configured to store information relating to the electronic device 100, such as the device identifier identifying the security module 110 of the electronic device 100 and one or more public keys, such as the EPK of the electronic device 100. Additionally or alternatively, the KMS 120 may be configured to communicate with the database 210 of the authority server system 130 to obtain such information. The KMS 120 is further configured to sign certificates.

The authority server system 130 comprises one or more servers and includes a database 210. One or more authority servers of the authority server system 130 is configured to sign certificates on behalf of the authority 140, for example to certify that the KMS 120 is trusted by the authority 140 or to sign firmware for installation on the electronic device 100. The database 210 is configured to store information concerning the electronic device 100, such as the device identifier that identifies the electronic device 100, and in some examples the firmware public key of the electronic device 100. The database 210 may be further configured to store information concerning the KMS 120. For example, the database 210 may contain information associating a batch of device identifiers with a particular KMS 120, and may be used to authorise the KMS 120 to interact with only those device identifiers with which it is associated.

The computing device 220 may comprise many connected devices (for example in a distributed computing environment) or a single computing device.

Figure 3A:
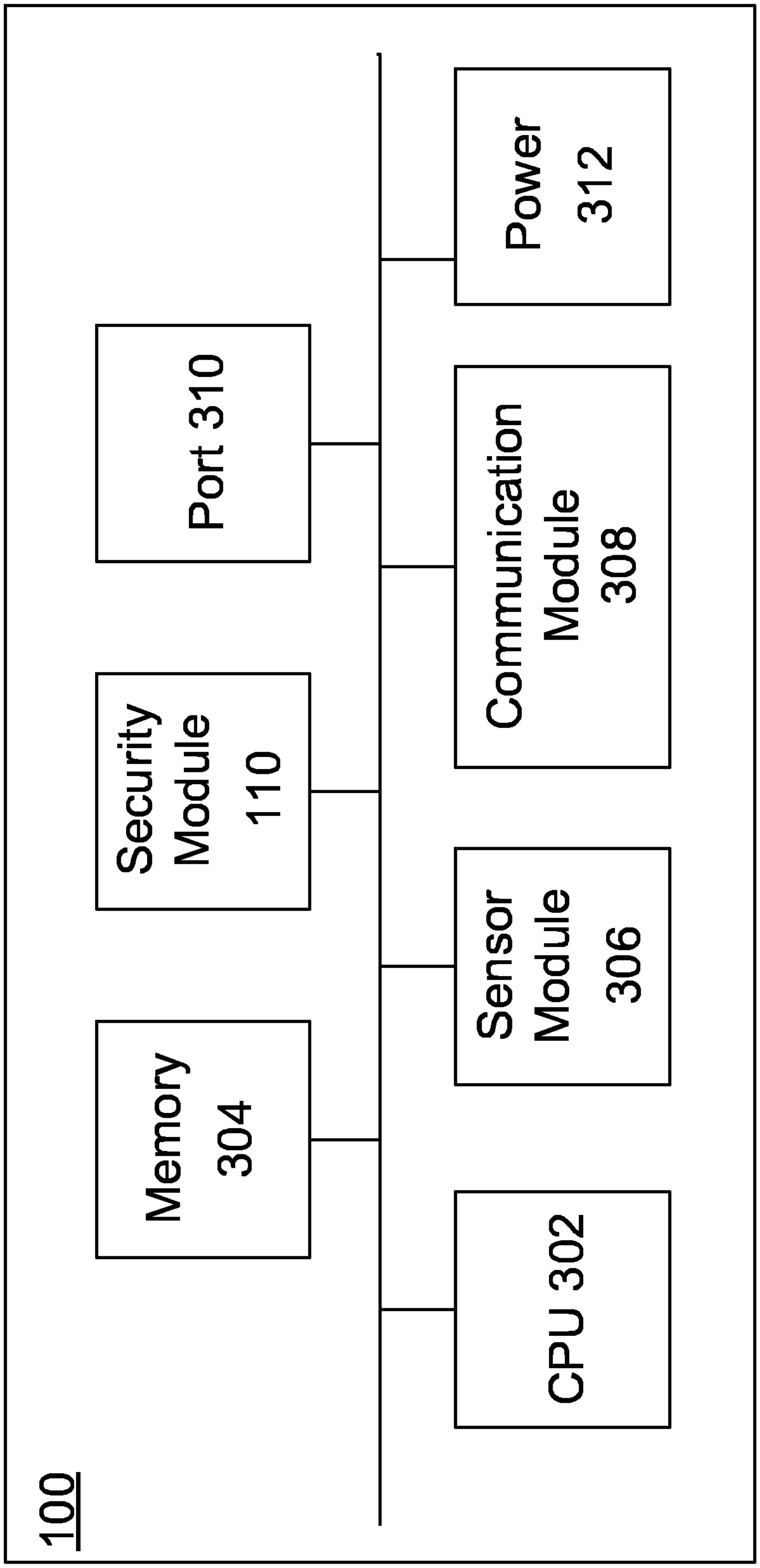
FIG. 3A shows a block diagram of an electronic device.

FIG. 3A shows a block diagram of an electronic device 100 according to an example. For example, electronic device 100 may be an IoT device. Other architectures to that shown in FIG. 3A may be used as will be appreciated by the skilled person.

Referring to the figure, electronic device 100 includes a security module 110, one or more CPUs/processors 302, one or more memories 304, a sensor module 306, a communication module 308, a port 310 and a power source 312. Each of components 302, 304, 306, 308, 310, 312 are interconnected using various busses. CPU 302 can process instructions for execution within the electronic device 100, including instructions stored in memory 304, received via communication module 308, or via port 310.

Memory 304 is for storing data within electronic device 100. The one or more memories 304 may include a volatile memory unit or units. The one or more memories may include a non-volatile memory unit or units. The one or more memories 304 may also be another form of computer-readable medium, such as a magnetic or optical disk. One or more memories 304 may provide mass storage for the electronic device 100. Instructions for performing a method as described herein may be stored within the one or more memories 304.

The communications module 308 is suitable for sending and receiving communications between processor 302 and other systems. For example, communication module 308 may be used to send and receive communications via a communication network 200 such as the Internet. Communication module 308 may enable the electronic device 100 to communicate with other devices/servers by any of a number of protocols, such as WiFi®, Bluetooth®, NFC, etc.

The port 310 is suitable for receiving, for example, a non-transitory computer readable medium containing instruction to be processed by the processor 302. The port 310 may be used, for example, for wired communications between the electronic device 100 and the key management server 120.

The sensor module 306 may comprise one or more sensors for a sensing parameter such as temperature, humidity, or any other parameter.

The processor 302 is configured to receive data, for example from the sensor module 306, the security module 110, or the communication module 308. The processor 302 is further configured to access the memory 304, and to act upon instructions and/or information received either from said memory 304, from communication module 308, or a computer-readable storage medium connected to port 310.

Figure 3B:
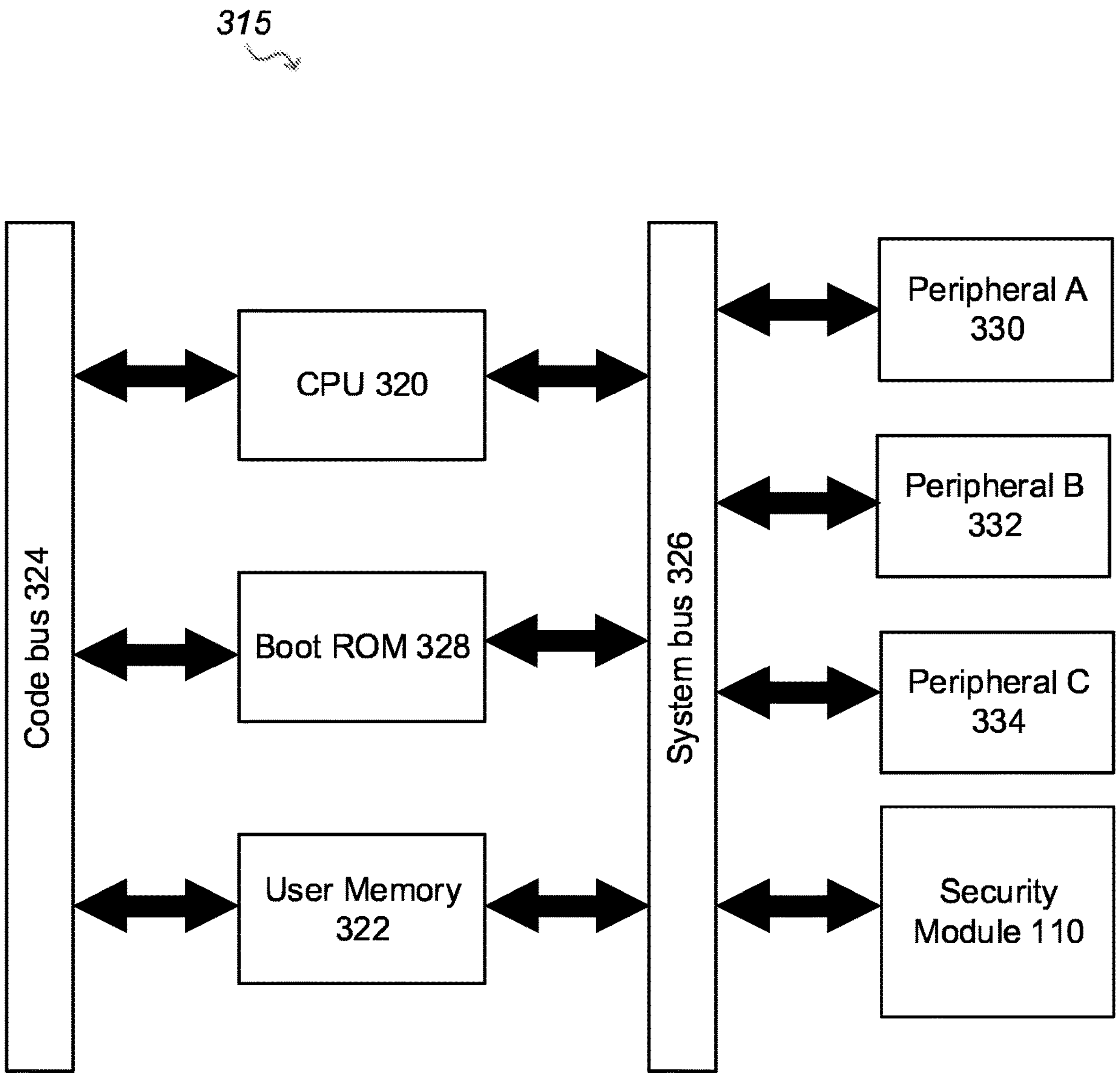
FIG. 3B shows a diagram of a microcontroller.

FIG. 3B shows architecture for another example of an electronic device 100, namely a microcontroller unit (MCU) 315, which may be installed within a larger electronic device. The skilled person would appreciate that other MCU architectures may be used.

The MCU 315 of FIG. 3B comprises a CPU 320, a user memory 322 and a Boot Random Access Memory 328. The CPU 320, Boot ROM 328 and user memory 322 may communicate via a code bus 324. The CPU 320, Boot ROM 328, and user memory 322 may be connected to a system bus 326, which may also be connected to a plurality of peripherals A, B and C (330, 332, and 334) and a security module 110. Only the components relevant to security have been illustrated in the MCU 315. The skilled person would appreciate that the MCU 315 may have more or fewer components. For example, the MCU 315 may have more peripherals and system components.

Figure 4A:
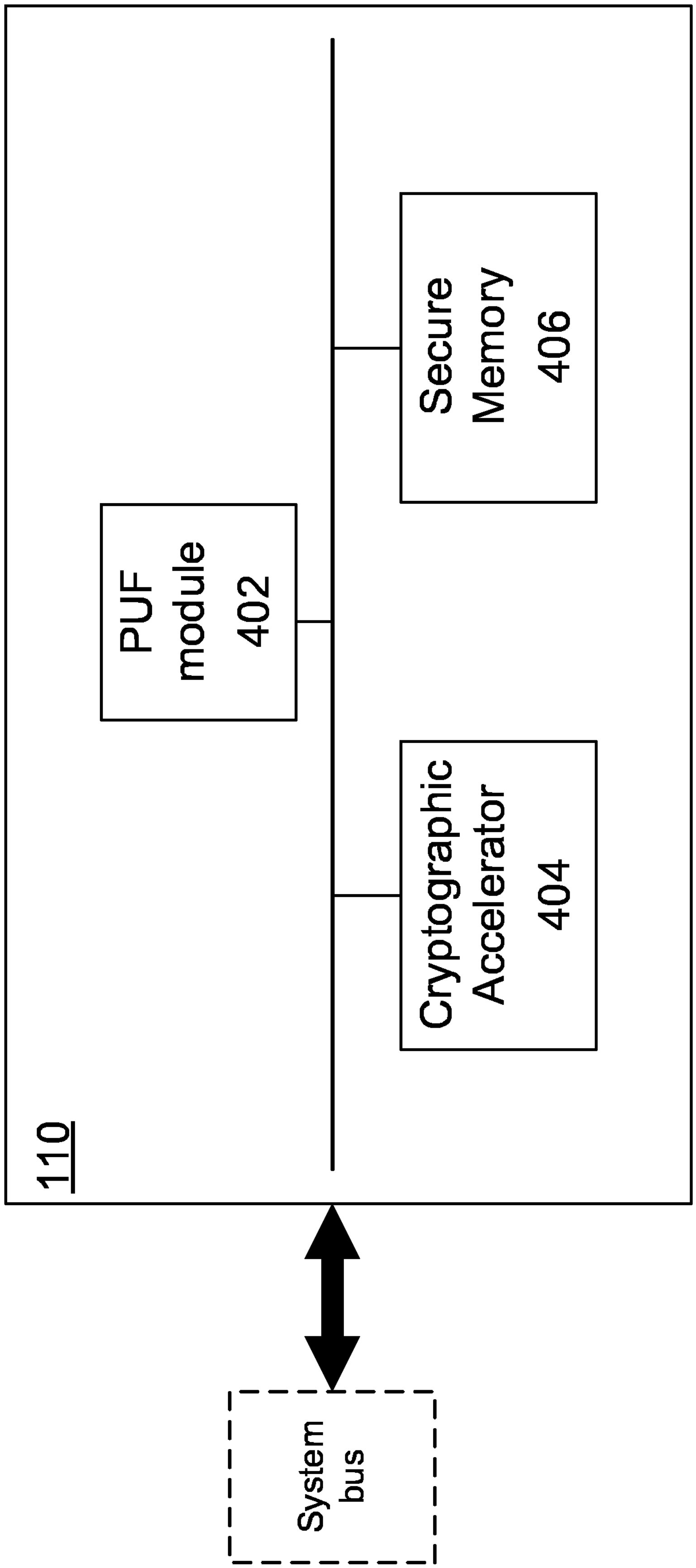
FIG. 4A shows a block diagram of a security module.

FIG. 4A shows a block diagram of a security module 110 according to an example. The security module 110 may be considered as a trust zone separating the secure components within from the other components of the electronic device 100. The security module 110 comprises a PUF module 402, a cryptographic accelerator 404 and a secure memory 406. The skilled person would appreciate that other architectures are also possible. The security module 110 is connected to a system bus of the electronic device 100.

The PUF module 410 comprises a PUF and any circuitry required to interact with the PUF. In particular, the PUF module may receive signals from the cryptographic accelerator 404 and provide an appropriate response. The cryptographic accelerator 404 comprises a dedicated processing unit for performing cryptographic operations and for interacting with the PUF module 402 and the secure memory 406.

The secure memory is configured to store secret information such as keys produced by the PUF module 402 and/or root certificates. The instructions needed by the CPU 320 to control the PUF module 402, security peripherals within the Security Module 110 and the secure memory are contained within the Boot ROM 328 which is part of the immutable booting process for the system.

Figure 4B:
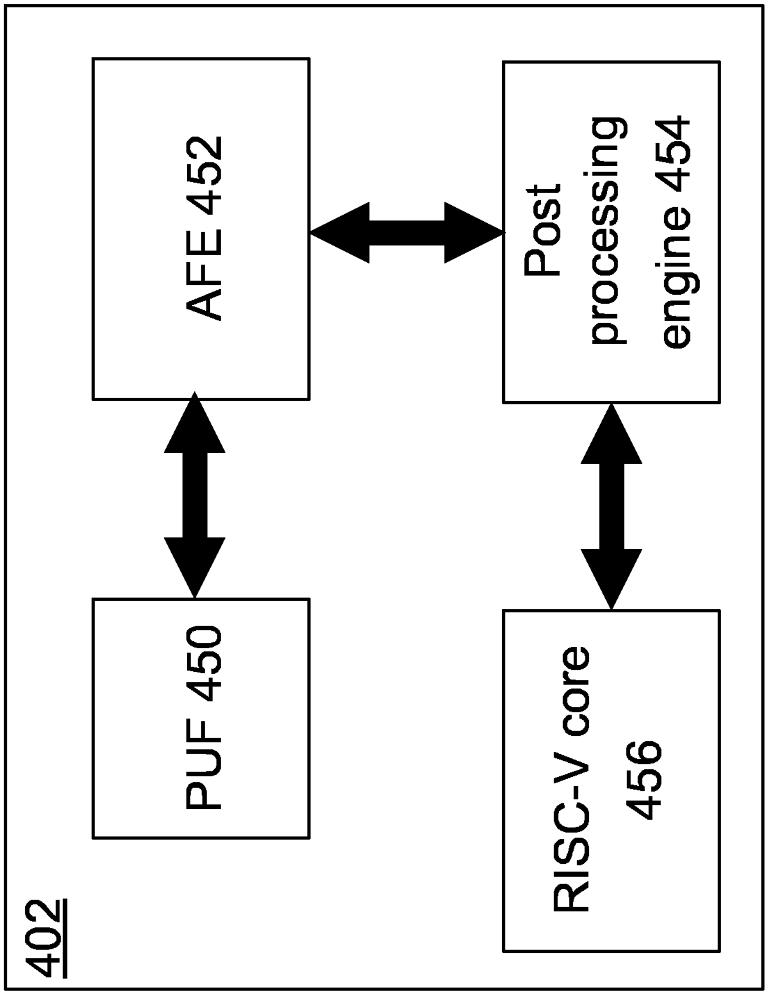
FIG. 4B shows a block diagram of a PUF module.

FIG. 4B illustrates the functional components of a PUF module 402 according to an example. The PUF module 402 comprises a PUF 450, an analog front-end (AFE) 452, a post-processing engine 454, and a RISC-V core 456.

The skilled person will appreciate that the PUF 450 may be any suitable PUF.

The analog front end (AFE) 452 comprises analog signal conditioning circuitry for interacting with the PUF. For example, the AFE may interact with the PUF 450 to establish a raw "fingerprint". The post-processing engine 454 is configured to correct the output of the AFE 452 and to provide further privacy enhancement by further processing the output of the AFE. The RISC-V core 456 is a CPU core that performs post processing of the data from the PUF 450, for example, error correction of the data. A RISC-V core provides an interface that allows easy connection of the PUF module 402 to an external microcontroller, although other CPUs may be utilised.

Figure 5:
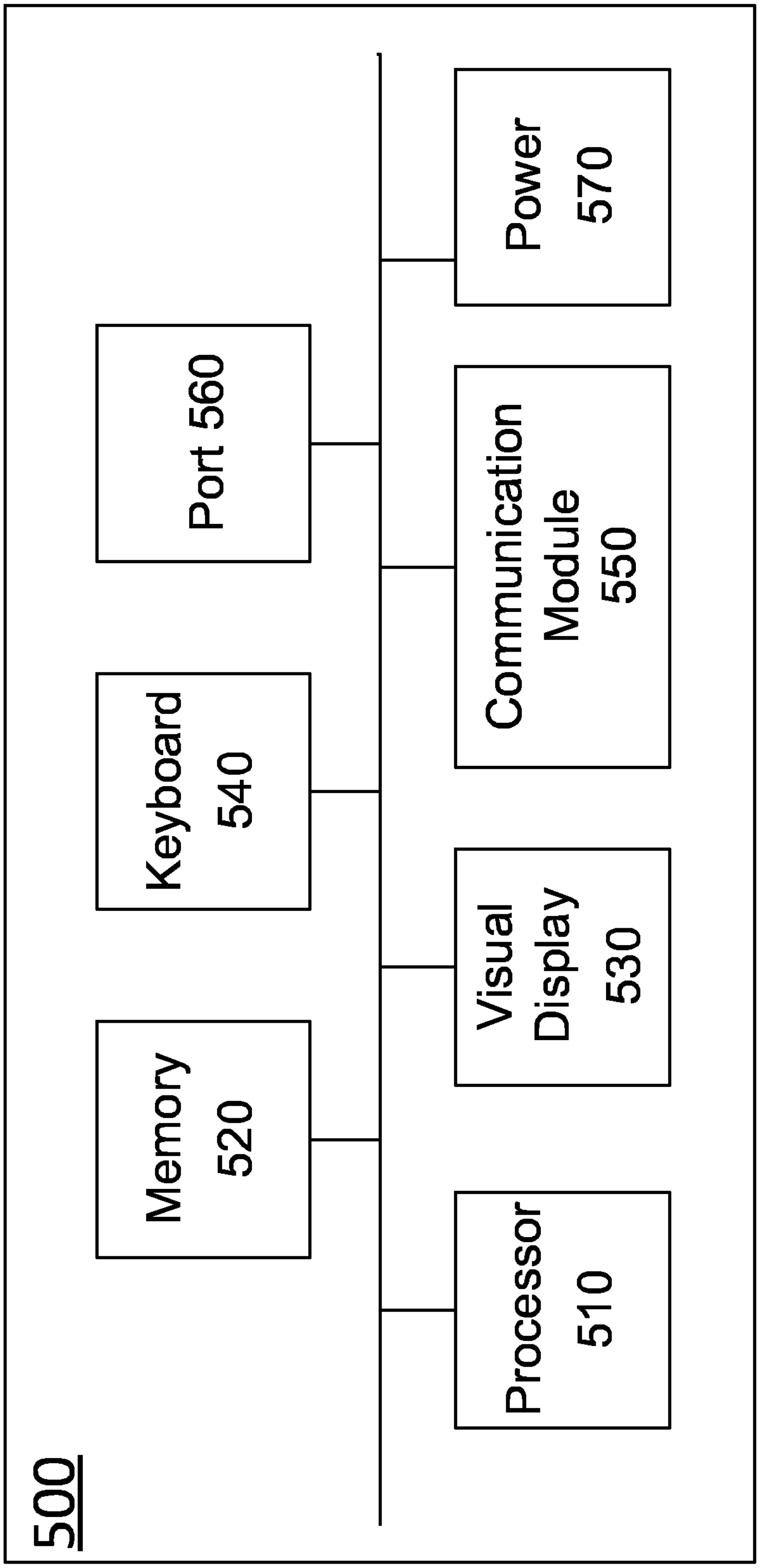
FIG. 5 shows a block diagram of computing apparatus.

FIG. 5 is a block diagram of a computing apparatus 500. For example, computing apparatus 500 may comprise a computing device, a server, a mobile or portable computer or telephone and so on. Computing apparatus 500 may be distributed across multiple connected devices. Computing apparatus 500 may be suitable for use as a key management server 120, an authority server of an authority server system 130, or a server 220 for use in for example an IoT hub. Other architectures to that shown in FIG. 5 may be used as will be appreciated by the skilled person.

Referring to the figure, computing apparatus 500 includes one or more processors 510, one or more memories 520, a number of optional user interfaces such as visual display 530 and virtual or physical keyboard 540, a communication module 550, and optionally a port 560 and optionally a power source 570. Each of components 510, 520, 530, 540, 550, 560, and 570 are interconnected using various busses. Processor 510 can process instructions for execution within the computing apparatus 500, including instructions stored in memory 520, received via communication module 550, or via port 560.

Memory 520 is for storing data within computing apparatus 500. The one or more memories 520 may include a volatile memory unit or units. The one or more memories may include a non-volatile memory unit or units. The one or more memories 520 may also be another form of computer-readable medium, such as a magnetic or optical disk. One or more memories 520 may provide mass storage for the computing apparatus 500. Instructions for performing a method as described herein may be stored within the one or more memories 520.

The apparatus 500 includes a number of user interfaces including visualising means such as a visual display 530 and a virtual or dedicated user input device such as keyboard 540.

The communications module 550 is suitable for sending and receiving communications between processor 510 and remote systems. For example, communications module 550 may be used to send and receive communications via a communication network 200 such as the Internet.

The port 560 is suitable for receiving, for example, a non-transitory computer readable medium containing instruction to be processed by the processor 510.

The processor 510 is configured to receive data, access the memory 520, and to act upon instructions received either from said memory 520 or a computer-readable storage medium connected to port 560, from communications module 550 or from user input device 540.

The computing apparatus 500 may further comprise a hardware security module (HSM), not shown in FIG. 5, in order to store cryptographic keys securely. For example, for computing apparatus 500 used as a key management server 120, a HSM may be required to store one or more secret keys for signing certificates, or a server encryption key and server decryption key for encrypting/decrypting firmware. For example, for computing apparatus 500 used as an authority server of an authority server system 130, a HSM may be required to store one or more secret keys such as a secret authority key (SAK) of an authority key pair. The skilled person would appreciate that an HSM is not required to store secret keys and other security arrangements may be applicable, For example a computing apparatus may access a cloud-based HSM.

Firmware may be securely provided to the electronic device 100. The firmware may be securely provided, for example, by signing the firmware at the authority server system 130 and encrypting the firmware, either before or after signing, at the KMS 120 and then sending the signed encrypted firmware to the programming house 180 to be programmed into the electronic device 100.

The firmware may include an identifier of the KMS 120 with which the electronic device is registered, and one or more root certificates for building a chain of trust. After firmware has been securely provided to an electronic device 100, the electronic device 100 can begin enrolment.

Figure 7:
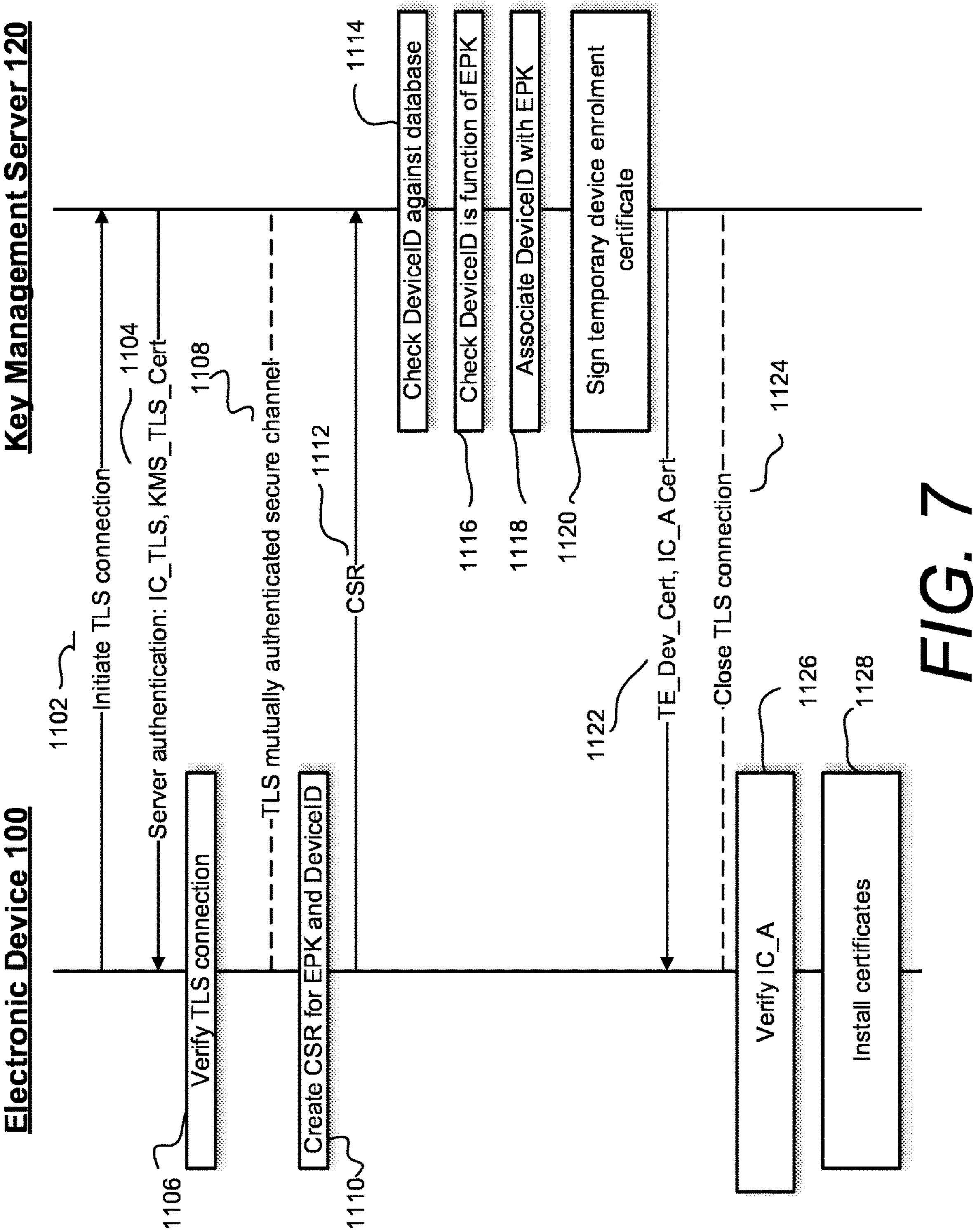
FIG. 7 shows a swimlane flowchart of a method for providing a temporary enrolment device certificate to an electronic device.
Figure 8:
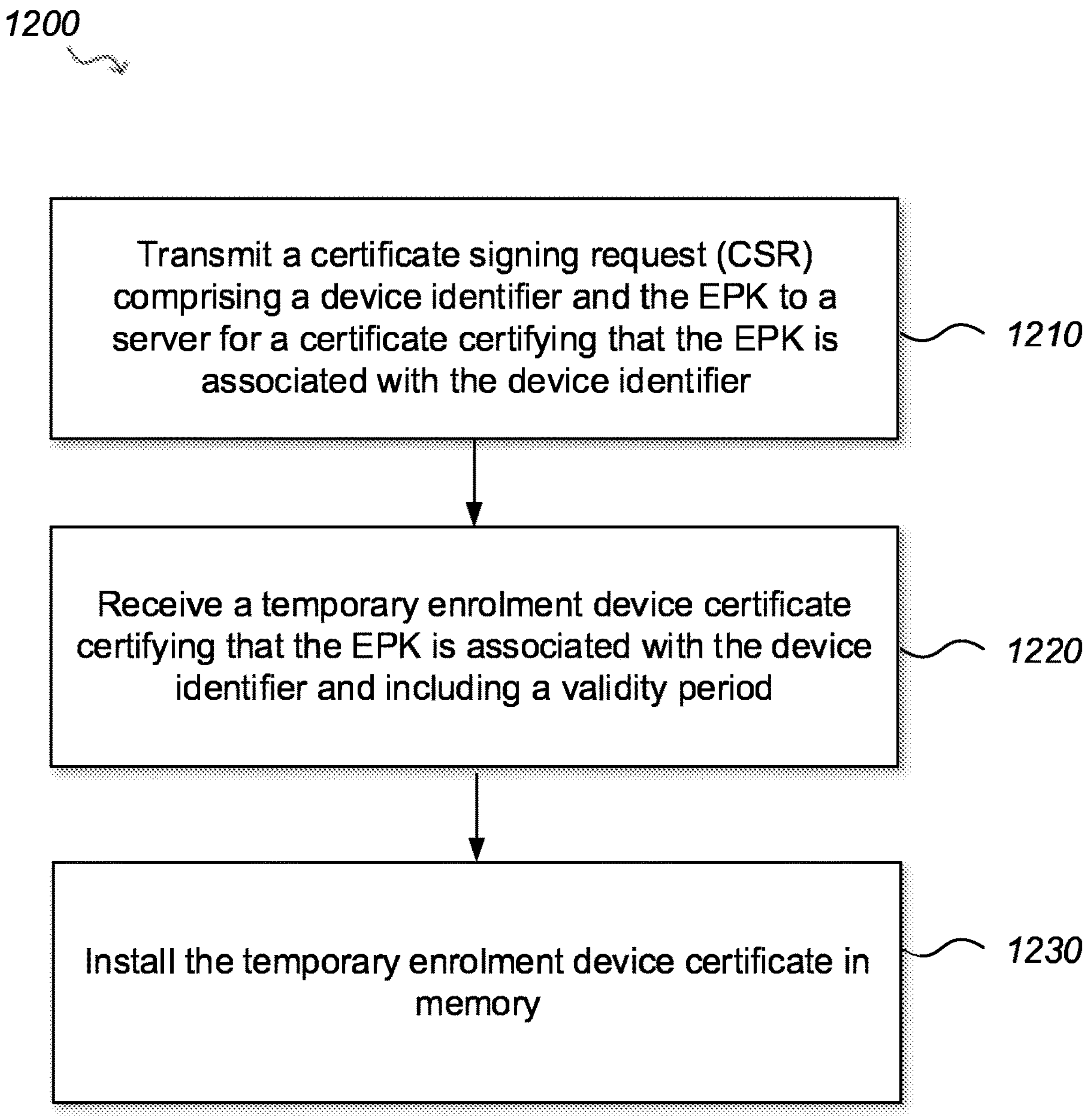
FIG. 8 shows a flowchart.
Figure 9:
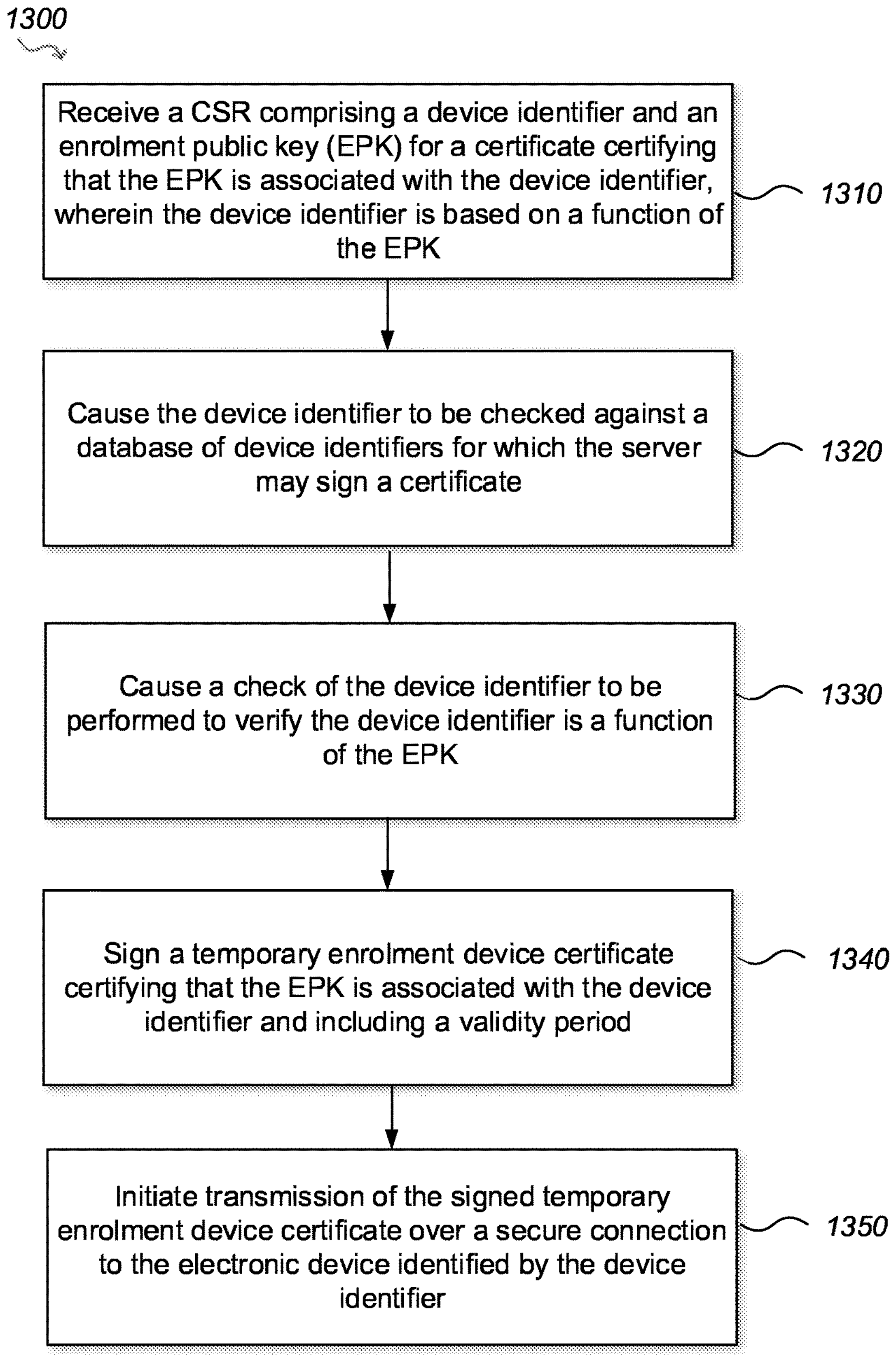
FIG. 9 shows a flowchart.

In relation to FIGS. 7-9, methods are described to provide an electronic device 100 with a temporary enrolment device certificate. Furthermore, in relation to FIGS. 10-12, methods are described to provide an electronic device with a device certificate (which can be used once deployed to connect with e.g. an IoT hub). In order for trust in the device certificate to be established, the electronic device needs to be provided with one or more root certificates for the OEM.

One or more root certificates may be installed on the electronic device 100 at the point of manufacture, or for added security may be provided to the electronic device 100 along with or as part of firmware installed securely prior to enrolment.

Figure 6A:
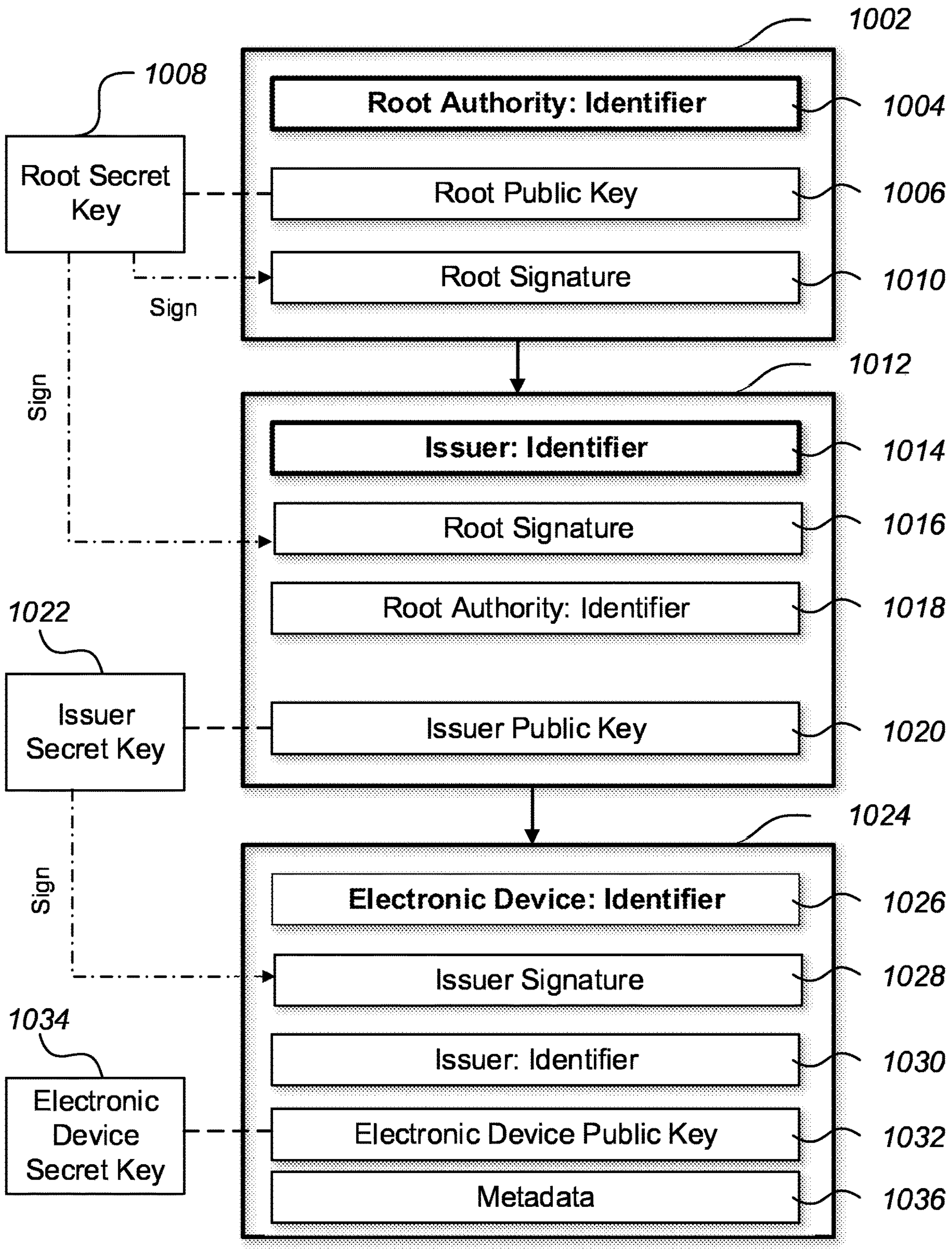
FIG. 6A shows an example of certificates in a chain of trust provided by a public key infrastructure.

FIG. 6A shows an example of a chain of trust provided by a public key infrastructure. The public key infrastructure is represented by a hierarchy of certificates (1002, 1012, 1024) which can be used to verify the source of messages. Each certificate includes a public key which corresponds to a private key held by the corresponding entity. The certificate includes information about the key, information about the identity of its owner (called the subject), and the digital signature of an entity that has verified the certificate's contents (called the issuer). Trust in the chain of trust ultimately derives from a root certificate authority (CA) associated with a root certificate 1002. A root certificate 1002 typically comprises an identifier/distinguished name of the root authority (1004), a public key of the root authority 1006 and a signature of the root authority (1010), the signature signed using the secret key 1008 corresponding to the root public key 1006.

A certificate authority can issue multiple certificates in the form of a tree structure. A root certificate 1002 is the top-most certificate of the tree, the private key 1008 of which is used to sign subordinate certificates. As shown in FIG. 6A, the root secret key 1008 can be used to sign an intermediate/subordinate certificate 1012. The intermediate certificate 1012 comprises an identifier/distinguished name 1014 of the intermediary/issuer, a public key of the intermediary 1020, the identity of the root authority 1018, and a signature of the root authority 1016. The veracity of the intermediate certificate 1012 can be checked by determining, from the identifier of the root authority 1018, an appropriate root certificate 1002 in which the root public key 1006 can be found. As the root public key 1006 corresponds to the root secret key 1008 used to sign the intermediate certificate 1012, the root public key 1006 can be used to decrypt the root signature 1016 of the intermediate certificate 1012 and further checks can be performed. The intermediate certificate may include further information, such as whether the issuer/intermediary associated with the intermediate certificate 1012 is authorised to sign further certificates. If the intermediate is authorised to sign subordinate certificates using the issuer secret key 1022 associated with the issuer public key 1020, then trust in any certificates signed using the issuer secret key 1022 can ultimately be derived from a chain of trust stemming from the root certificate authority associated with the root certificate 1002.

The issuer secret key 1022 in FIG. 6A is used to sign an end certificate 1024 associated with an electronic device. Typically an end certificate shows that the party to which the end certificate is associated is not entitled to sign further certificates in the chain of trust. The end device certificate 1024 contains an identifier of the electronic device 1026 to which the certificate 1024 is issued, the identifier of the issuer that has certified the end certificate 1012, a public key 1032 corresponding to the electronic device, a signature of the issuer 1028 and any further information/metadata 1036 certified by the issuer. The end certificate 1024 thus certifies that the public key 1032 is associated with the entity identified (1026) by the end device certificate 1024, with a chain of trust stemming from the root certificate authority. There is an electronic device secret key 1034 associated with the electronic device public key 1032.

Of course, while three certificates are shown in FIG. 6A, the chain may be longer with several intermediate certificates.

Certificates of a certificate chain may include further information. For example, a certificate may comprise a version number, a serial number, a signature algorithm ID, information on the public key algorithm used and so on. A certificate may include a validity period. There are several known standard formats for public key certificates, of which the most commonly used is X.509. X.509 certificates are used in many protocols, including TLS/SSL and may be used with the methods described herein.

Conventionally, when an OEM manufactures a device, they rely upon secret information being injected into that electronic device in unencrypted form. For example, a secret key may need to be injected into the device. Furthermore, further certificate information is typically also provided to the device, for example an end certificate 1024. If the manufacturer provides the device with a secret key and an end certificate 1024 there are several drawbacks. Firstly, a downstream party such as an OEM or IoT hub would need to trust that the secret key has been securely provided to the device and that it is not known to any other parties. Secondly, a downstream party such as the OEM may have to trust a chain of trust based on trust in the manufacturer, and this can have security consequences when dealing with e.g. firmware updates. Alternatively, a temporary enrolment certificate may be provided to a device during manufacture. A temporary enrolment certificate may contain a public key associated with the secret key injected into the device, thereby associating the device with that public key, and some finite validity period for enrolling with a service. However, the provision of the temporary enrolment device certificate and associated secret key typically requires a secure facility.

In contrast, a different approach will now be described. In particular, FIGS. 7-9 and the accompanying text describe example methods for providing a temporary enrolment device certificate to an electronic device, and FIGS. 10-12 and the accompanying text describe example methods for providing an end device certificate to the electronic device, ready for deployment. In the examples described, an OEM 160 may be sure that it is they who are the ultimate certificate authority on which trust in a deployed electronic device is based.

Figure 6B:
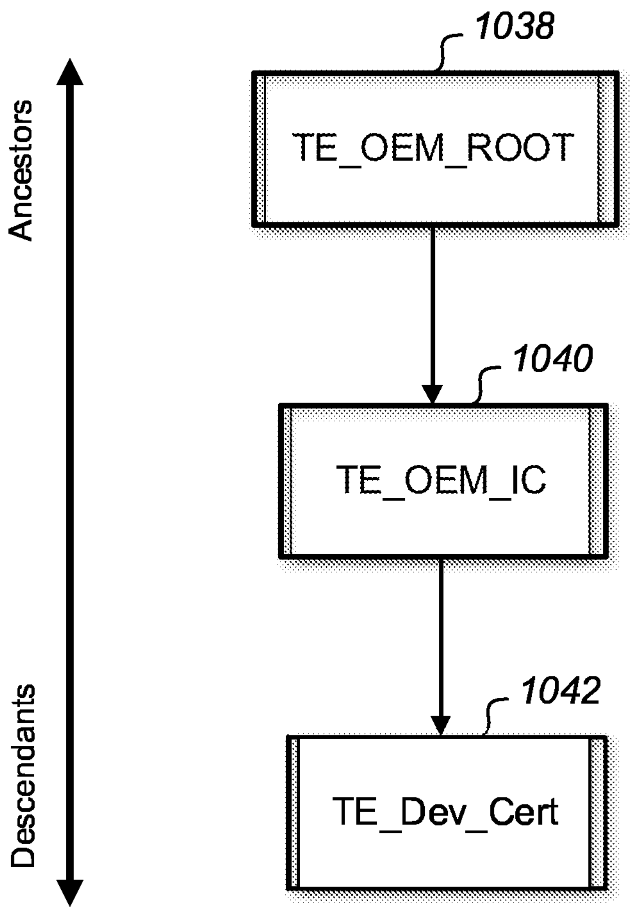
FIG. 6B shows an example of certificates in a chain of trust used for providing a temporary enrolment device certificate to an electronic device.
Figure 6C:
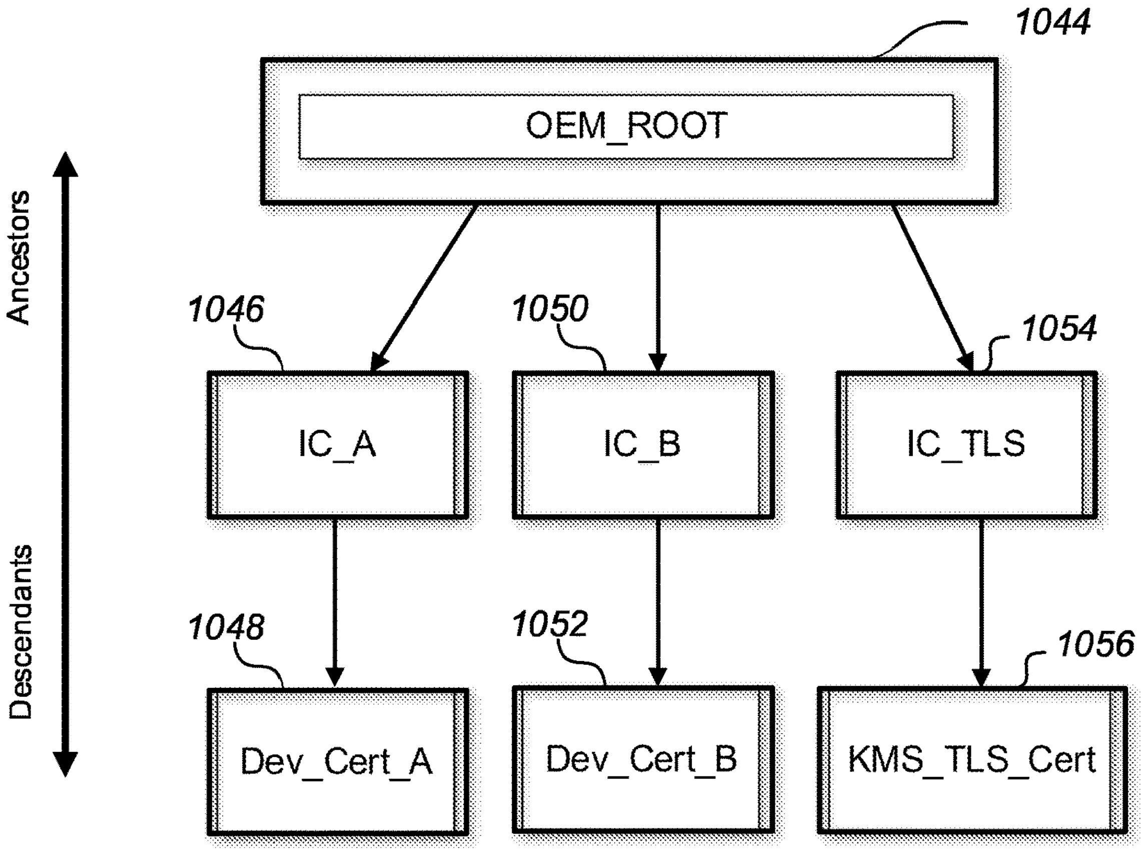
FIG. 6C shows an example of certificates in a chain of trust used for providing a device certificate to an electronic device.
Figure 6D:
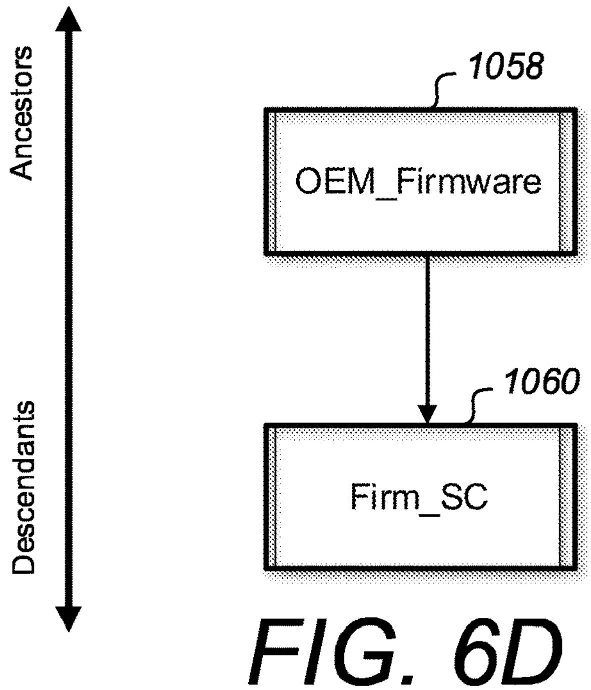
FIG. 6D shows an example of certificate in a chain of trust for authenticating firmware.

FIGS. 6B, 6C and 6D, show three certificate chains that are usable in examples described herein. With reference to FIG. 1 for illustrative purposes only, the root certificates 1038, 1044 and 1058 may all be associated with an OEM 160. That is, the OEM 160 may be the root certificate authority associated with the root certificates 1038, 1044, 1058. While three certificate chains are described herein, other scenarios are also envisaged, for example a single root certificate may be the root certificate from which all others are descended. Electronic devices 100 produced by the OEM may be provisioned with the appropriate root certificates, from which a chain of trust can be built such that the electronic devices 100 can be sure of any software or communications provided to the devices.

For ease of explanation, the certificate chains of FIGS. 6B-6D are described with reference to the parties of FIG. 1, with the OEM 160 being the certificate authority associated with the root certificate of all three chains. However, the skilled person would appreciate that other scenarios are also applicable.

FIG. 6B shows a certificate chain according to an example. The certificate chain of FIG. 6B will be described in use further below. In FIG. 6B, a temporary enrolment trusted root certificate 1038 (labelled "TE_OEM_Root") is self-signed using an appropriate secret key known only to the OEM 160. A temporary enrolment issuing certificate 1040 (labelled "TE_OEM_IC") is certified by the root certificate 1038. That is, a secret key associated with a public key identified in the temporary enrolment trusted root certificate 1038 is used to sign the temporary enrolment issuing certificate 1040. A temporary enrolment device certificate 1042 (labelled "TE_Dev_Cert") is certified by the temporary enrolment issuing certificate 1040. That is, a secret key associated with a public key identified in the temporary enrolment issuing certificate 1040 is used to sign the temporary enrolment device certificate 1042.

As will be discussed in relation to FIG. 7, the OEM 160 may be the certificate authority with which the temporary enrolment trusted root certificate 1038 is associated, and the OEM or the KMS 120 (in the OEM's possession) possesses the associated secret key. The secret key associated with the temporary enrolment issuing certificate 1040 may be in the possession of the KMS 120. The OEM's temporary enrolment (TE) PKI is used to issue temporary enrolment device certificates, which will enable electronic devices to authenticate to the KMS during the enrolment protocol. These certificates should be used for no other purpose, and so the temporary enrolment trusted root certificate 1038 and temporary enrolment issuing certificate 1040 do not need to leave the KMS.

FIG. 6C shows a certificate chain according to an example. The certificate chain of FIG. 6C will be described in use further below. In FIG. 6C, primary trusted root certificate 1044 (labelled "OEM_ROOT") is self-signed using an appropriate secret key. In FIG. 6C, three intermediate certificates 1046, 1050, 1054 are shown.

The trust anchor for the OEM's primary PKI is the self-signed primary trusted root certificate 1038, which is used for issuing all certificates that are used externally from the KMS 120 during enrolment. Below the primary trusted root certificate 1038 are a number of issuing certificates.

A secure connection issuing certificate 1054 is signed by the root secret key associated with the primary trusted root certificate 1044. In the examples described below, the secure connection itself is a TLS connection, and accordingly the secure connection issuing certificate 1054 is labelled "IC_TLS" in FIG. 6C. The issuer secret key associated with the secure connection issuing certificate 1054 is used to sign a secure connection certificate 1056 (labelled "KMS_TLS_Cert"). In the examples described below, the secure connection certificate 1056 is used by a KMS 120 to authenticate to an electronic device 100 during TLS server authentication.

FIG. 6C shows two further intermediate certificates 1046, 1050 descended from the primary trusted root certificate 1044. The intermediate certificates 1046, 1050 (labelled respectively "IC_A" and "IC_B") are used to certify descendant device certificates associated with device-specific policies. For example, IC_A 1046 may be used to certify device certificates for a first class of IoT devices (e.g. toasters) based on the security policies for that first class of IoT devices, and IC_B 1050 may be used to certify device certificates for a second class of IoT devices (e.g. lightbulbs) based on the security policies for that second class of IoT devices. This can be useful in enforcing security policy, since devices of a given type can be identified from their certificates by checking which issuing certificate was used to sign it.

End certificates for devices signed by the intermediate certificates IC_A and IC_B are also shown in FIG. 6C (labelled "Dev_Cert_A" 1048 and "Dev_Cert_B" 1052 respectively). As will be seen in the examples below, a device certificate 1048 can be used by an electronic device 100 to authenticate to its IoT hub 170.

The skilled person would appreciate that while two intermediate certificates 1046, 1050 for issuing device certificates are shown in FIG. 6C, more or fewer intermediate issuing certificates may descend from the primary trusted root certificate 1044.

FIG. 6D shows a certificate chain according to an example. In FIG. 6D, a firmware root certificate 1058 (labelled "OEM_Firmware") is self-signed by the certificate authority. A firmware signing certificate 1060 (labelled "Firm_SC") is descended from that root certificate.

The firmware signing certificate 1060 may be used to sign firmware that is injected into electronic devices 100. The firmware signing PKI has a separate root from the primary and temporary enrolment PKIs. This is because the OEM 160 can use the firmware signing certificate to sign arbitrary messages, certificates etc., and keeping this PKI separate ensures that the firmware PKI cannot be used (accidentally or maliciously) to sign anything that compromises the security of enrolment.

The skilled person would appreciate that the names of the certificates used in the description above of the PKIs in FIGS. 6B, 6C and 6D are used only to distinguish the three PKIs only.

Whenever an electronic device 100 or KMS 120 verifies a certificate, as many useful attributes as possible should be checked (e.g., subject name, usage restrictions, the name of the issuing party etc.). For electronic devices to be able to do this, their firmware must contain the information required to make these checks, such as an identifier of the KMS 120 and what naming structure they should expect for different certificates. Electronic devices should verify all signatures in the chain where possible, check that intermediate certificates in the chain are authorised to issue certificates (to prevent e.g., a compromised device trying to issue a certificate using its device certificate), and check that all certificates are unexpired (if they have access to the time).

FIG. 7 illustrates an example method for providing a temporary enrolment device certificate 1042 to an electronic device 100.

The electronic device 100 comprises a security module 110 having a PUF 450, the security module 110 configured to establish an enrolment key pair (EPK, ESK) based on a first challenge and response to the PUF, the enrolment key pair comprising an enrolment public key (EPK) and an enrolment secret key (ESK). In an example, the security module may be configured to establish the enrolment public key (EPK) based on a first challenge to the PUF 450, and the enrolment secret key based on a response to the first challenge to the PUF 450.

The objective of this exchange is for the electronic device 100 to request and be issued a temporary enrolment device certificate 1042 for its EPK. The device will use this to authenticate to the KMS 120 in the second handshake detailed further below in relation to FIG. 10. The KMS 120 in this example will only issue certificates for EPKs that correspond to the device identifiers that it owns (that is, those device identifiers that it has registered). The KMS 120 will also send the electronic device the issuing certificate IC_A 1046 which will ultimately be used to issue its end device certificate (in this example Dev_Cert_A 1048), which the electronic device 100 will store in order to verify subsequent certificates issued by the KMS 120.

The electronic device 100 initiates (at 1102) a TLS connection to the KMS 120 identified by the URL installed in firmware on the electronic device 100. During the handshake, the KMS 120 authenticates (at 1104) to the client by presenting the KMS_TLS_Cert 1056 and TLS issuing certificate IC_TLS 1054, enabling the electronic device 100 to build a chain from the primary root certificate 1044 (previously installed on the electronic device 100) to the TLS certificate 1056. The electronic device 100 verifies (at 1106) the chain of trust for the TLS connection. The electronic device 100 only accepts certificate chains that begin with the primary trusted root certificate 1044. The electronic device 100 checks that the subject name in the certificate 1056 is identical to the KMS identifier included in their firmware. If possible, the electronic device 100 should check that the TLS certificate 1056 was signed by the TLS issuing certificate 1054. If authentication fails, the device terminates the connection. When client authentication is requested, the device 100 indicates that it has no suitable certificate and does not authenticate to the KMS 120.

Assuming that none of the OEM's keys are compromised, this step proves to the electronic device 100 that it is talking to the real KMS 120 associated to the KMS identifier in the device's firmware. The electronic device 100 should check the subject name in the TLS matches what is expected, otherwise the electronic device 100 may be vulnerable to accepting connection from any certificate signed by the primary trusted root certificate 1044, and so for example might talk to a compromised device. It should be ensured that no other certificate is issued with the same subject name, otherwise the party owning this certificate could use the certificate to impersonate the KMS 120 to the electronic device 100.

If the TLS connection is verified at 1106, a secure TLS communication channel is opened (1108) between the electronic device 100 and the KMS 120.

The electronic device 100 creates a Certificate Signing Request (CSR) at 1110. In public key infrastructure (PKI) systems, a CSR is a message sent from an applicant to a registration authority of the public key infrastructure in order to apply for a digital identity certificate. It usually contains the public key for which the certificate should be issued, identifying information (such as a domain name or a device identifier based on an EPK) and integrity protection (e.g., a digital signature). The most common format for CSRs is the PKCS #10 specification; another is the Signed Public Key and Challenge SPKAC format.

At 1110, a CSR is created for associating the enrolment public key EPK with the device identifier. As described further above, the device identifier is a function of the EPK (f(EPK)) and, for the purposes of this discussion the device identifier comprises a hash of the EPK, H(EPK). Accordingly, in the CSR the public key is identified as the EPK and the subject name/distinguished name/identifier is identified as H(EPK). Looking ahead, the requested certificate will be used by the electronic device 100 to authenticate to the KMS 120 during a subsequent TLS handshake. The CSR is sent to the KMS 120 at 1112.

The CSR includes a proof of possession for the enrolment secret key ESK in the form of a signature over the CSR. However, this does not necessarily prove to the KMS 120 that the CSR was computed by the electronic device 100 at the other end of the TLS connection; if an attacker somehow managed to learn a previous CSR computed by a device (unlikely since these are sent encrypted under TLS connection) they could replay this to the KMS 120 in a separate connection. However, even if the attacker could execute such an attack they cannot use the returned certificate since they do not know the corresponding EPK.

On receiving the CSR, the KMS 120 performs several checks.

The KMS 120 checks, at 1114, the device identifier provided in the subject field of the CSR against a database to verify that the KMS 120 is authorised to sign certificates for the electronic device 100 associated with that device identifier, in other words that the KMS 120 "owns" that device identifier. The appropriate database may be held locally on the KMS 120 or may be accessed via a request to the authority server system 130.

The KMS 120 further checks, at 1116, that the enrolment public key EPK in the public key field of the CSR hashes to the device identifier in the subject name field. That is, the KMS, verifies that the device identifier DeviceID=H(EPK).

The checks at 1114 and 1116 may be performed in any order or simultaneously. If either check fails, the KMS 120 terminates the connection. If they succeed, the KMS 120 associates the EPK with the device identifier—the KMS 120 adds the EPK to their entry for the device identifier in a database.

Checking that the public key in the CSR corresponds to one of the device identifiers in the database is important, otherwise an attacker could request a certificate for an arbitrary key pair. Imposing this check means certificates can only be requested for public keys which hash to one of the device identifiers owned by the KMS 120. The only way that an attacker can get the KMS 120 to issue a certificate for any public key other than the real EPK underlying the device identifier is if they can find a different EPK which hashes to the same device identifier. This requires the attacker to find a collision in the hash function, which by definition is a highly difficult task.

Once all checks are completed, the KMS 120 signs a temporary enrolment device certificate 1042 (labelled "TE_Dev_Cert"). The temporary enrolment device certificate 1042 includes: the device identifier as the Subject Name, EPK as the public key, and a validity period. The TE_Dev_Cert 1042 is signed by secret key associated with the temporary enrolment issuing certificate 1040 (TE_OEM_IC).

As discussed above, OEMs are effectively restricted to only request certificates for EPKs generated by the electronic devices 100 owned by the KMS during manufacturing, and no party other than the real device knows the corresponding ESK. As such, the temporary enrolment device certificate 1042 should be useless to all parties except the real electronic device 100. The temporary enrolment device certificate 1042 has a short validity period to help enforce its use as a temporary credential used in enrolment only. For example, the validity period may be five minutes or less.

The issuing certificate IC_A 1046 specified by the security policy associated to that batch of devices, and the signed TE_Dev_Cert 1042 are both communicated, at 1122, to the electronic device 100.

The TLS connection is closed at 1124.

The electronic device 100 then checks 1126 the credentials received at 1122 and, if successful, installs (1128) the TE_Dev_Cert 1042 and the IC_A 1046.

The electronic device 100 verifies the issuing certificate IC_A 1046 provided in the handshake. The electronic device 100 checks that the subject name field matches that expected, that the issuing certificate IC_A 1046 can be used to issue certificates, and verifies the signature over the issuing certificate IC_A 1046 using the primary trusted root certificate 1044. For added security, the electronic device 100 should only accept an issuing certificate IC_A if it has been directly signed by the primary trusted root certificate 1044 rather than an intermediate CA. If possible, it should be ensured that the checks performed are sufficient that the electronic device 100 will only accept a/the real device issuing certificate; in particular, they should reject the TLS issuing certificate 1054 and any certificates issued by it, and should reject any device certificates, and any certificate issued by a device certificate. If the checks pass, the electronic device 100 installs the issuing certificate IC_A 1046 so it can be used to authenticate subsequent certificates issued by the OEM 160.

The electronic device 100 should reject any certificate which is not one of the KMS's real issuing certificates (ideally, the specific issuing certificate for the device, if this is known ahead of time).

The electronic device 100 also checks that the device ID and EPK in the TE_Dev_Cert 1042 match those belonging to the electronic device 100. This ensure the TE_Dev_Cert 1042 is suitable for them to use for authentication in the next handshake.

If any of these checks fails, the electronic device 100 aborts enrolment.

In this example, as the TE_Dev_Cert 1042 was received over a TLS channel for which the KMS 120 has authenticated to the electronic device 100, the TE_Dev_Cert 1042 can be implicitly trusted as having been approved by the KMS 120. Accordingly, the electronic device need not check that the TE_Dev_Cert 1042 is a descendant of a particular temporary enrolment root certificate, TE_OEM_ROOT 1038. Advantageously, this means that neither the TE_OEM_ROOT 1038 or the issuing certificate TE_OEM_IC 1040 need ever leave the KMS 120. However, in other examples, the temporary enrolment root certificate 1038 may be pre-installed on the device as part of the OEM firmware and the KMS 120 may also send, over the secure connection, the temporary enrolment issuing certificate 1040, such that the electronic device is able to build a chain of trust to the temporary enrolment device certificate 1042.

After the exchange of FIG. 7 is carried out, the electronic device 100 is in possession of a temporary enrolment device certificate 1042 certifying that the EPK is associated with the electronic device 100. The temporary enrolment device certificate 1042 also provides a validity period in which the electronic device is able to conduct a further exchange with the KMS. The EPK is at this stage widely known, by for example the authority server 130 and so on. The electronic device 100 is also in possession of an issuing certificate 1046 that can be used to verify a device certificate 1048 issued in a subsequent exchange.

Advantageously, a temporary enrolment device certificate is provided to the device without the need for any secure information to be injected into the device. Injecting secure information requires either a secure facility in which to inject the secret information into the electronic device, and/or trust in a third party's ability to inject the information securely. Secure facilities are costly, difficult to manage, and require ongoing maintenance and evaluation of security procedures to ensure a robust response to new threats. Typically, a hardware security module (HSM) may be required to generate and store keys, an integrated key injection system may be required to inject a key into an electronic device, and even then if the HSM and/or secure facility is compromised then the integrity of the injected information cannot be ensured. Therefore, the avoidance of the need for secure information to be injected provides ease of management of the electronic device and is more secure, with the integrity of the information being ensured.

FIG. 8 shows a flowchart of a general method 1200 for performance by an electronic device 100. The electronic device 100 comprises a security module 110 having a physical unclonable function (PUF) 450, the security module 110 configured to establish an enrolment key pair (EPK, ESK) based on a first challenge and response to the PUF, the enrolment key pair comprising an enrolment public key (EPK) and an enrolment secret key (ESK). In an example, the security module 110 may be configured to establish the enrolment public key (EPK) based on a first challenge to the PUF 450 and the enrolment secret key (ESK) based on a response to the first challenge to the PUF 450. The electronic device 100 further comprises one or more memories having installed thereon a temporary enrolment trusted root certificate 1038.

The method 1200 comprises, at 1210, over a secure connection, transmitting a certificate signing request (CSR) comprising a device identifier and the EPK to a server for a certificate certifying that the EPK is associated with the device identifier, wherein the CSR is signed using the ESK, and wherein the device identifier is based on a function of the EPK. The secure connection may comprise a TLS connection. For example, the secure connection may comprise a TLS connection with a key management server 120.

The method 1200 further comprises, at 1220, over the secure connection, receiving a temporary enrolment device certificate 1042 certifying that the EPK is associated with the device identifier and including a validity period.

The validity period may prescribe a time period in which a further secure connection can be established with the party at the other end of the secure connection.

The one or more memories of the electronic device 100 may also have installed thereon a primary trusted root certificate 1044, and the method 1200 may comprise receiving an issuing certificate 1046 that is a descendant from the primary trusted root certificate 1044. The method may further comprise verifying that the issuing certificate 1046 is directly descended from the primary trusted root certificate 1044.

The method 1200 further comprises, at 1230 installing the temporary enrolment device certificate 1042 in memory. If the temporary enrolment device certificate was received over a secure channel after the KMS 120 has authenticated to the electronic device 100, the temporary enrolment device certificate 1042 may be trusted by the electronic device to have come from the KMS. However, in other examples, the temporary enrolment root certificate 1038 may be pre-installed on the device as part of the OEM firmware, or also received by the electronic device over the communication channel.

FIG. 9 shows a flowchart of a method 1300. The method may be performed by, for example, a key management server 120.

At 1310, the method 1300 comprises receiving a certificate signing request (CSR) comprising a device identifier and an enrolment public key (EPK) of an enrolment key pair established by an electronic device for a certificate certifying that the EPK is associated with the device identifier, wherein the device identifier is based on a function of the EPK.

At 1320, the method 1300 comprises causing the device identifier to be checked against a database of device identifiers for which the server may sign a certificate. For example, the database may be stored locally in which case the database may be directly consulted, as envisaged in the scenario described with respect to FIG. 7. However, in other examples, the database may be located in a remote server, for example with an authority server 130, in which case a request may be made to check the device identifier against the database.

At 1330, the method 1300 further comprises causing a check of the device identifier to be performed to verify the device identifier is a function of the EPK. The server may directly evaluate whether the device identifier is a function of the EPK or may communicate with another computing device to verify that the device identifier is a function of the EPK. In some examples, the function may be a cryptographic hash function.

At 1340, the method 1300 comprises causing the EPK to be associated with the device identifier in the database. For example, the database may be stored locally in which case the database may be directly amended, as envisaged in the scenario described with respect to FIG. 7. However, in other examples, the database may be located in a remote server, for example with an authority server 130, in which case a request may be made to associate the device identifier with the EPK in the database.

At 1350, the method 1300 comprises signing a temporary enrolment device certificate certifying that the EPK is associated with the device identifier and including a validity period.

At 1360, the method 1300 comprises initiating transmission of the signed temporary enrolment device certificate over a secure connection to the electronic device identified by the device identifier. The signed temporary enrolment certificate may be sent directly to the electronic device identified by the device identifier, or may be passed to another computing device for onward transmission to the electronic device 100 over a secure connection.

The method may further comprise initiating communication of an issuing certificate 1046 to the electronic device.

Figure 10:
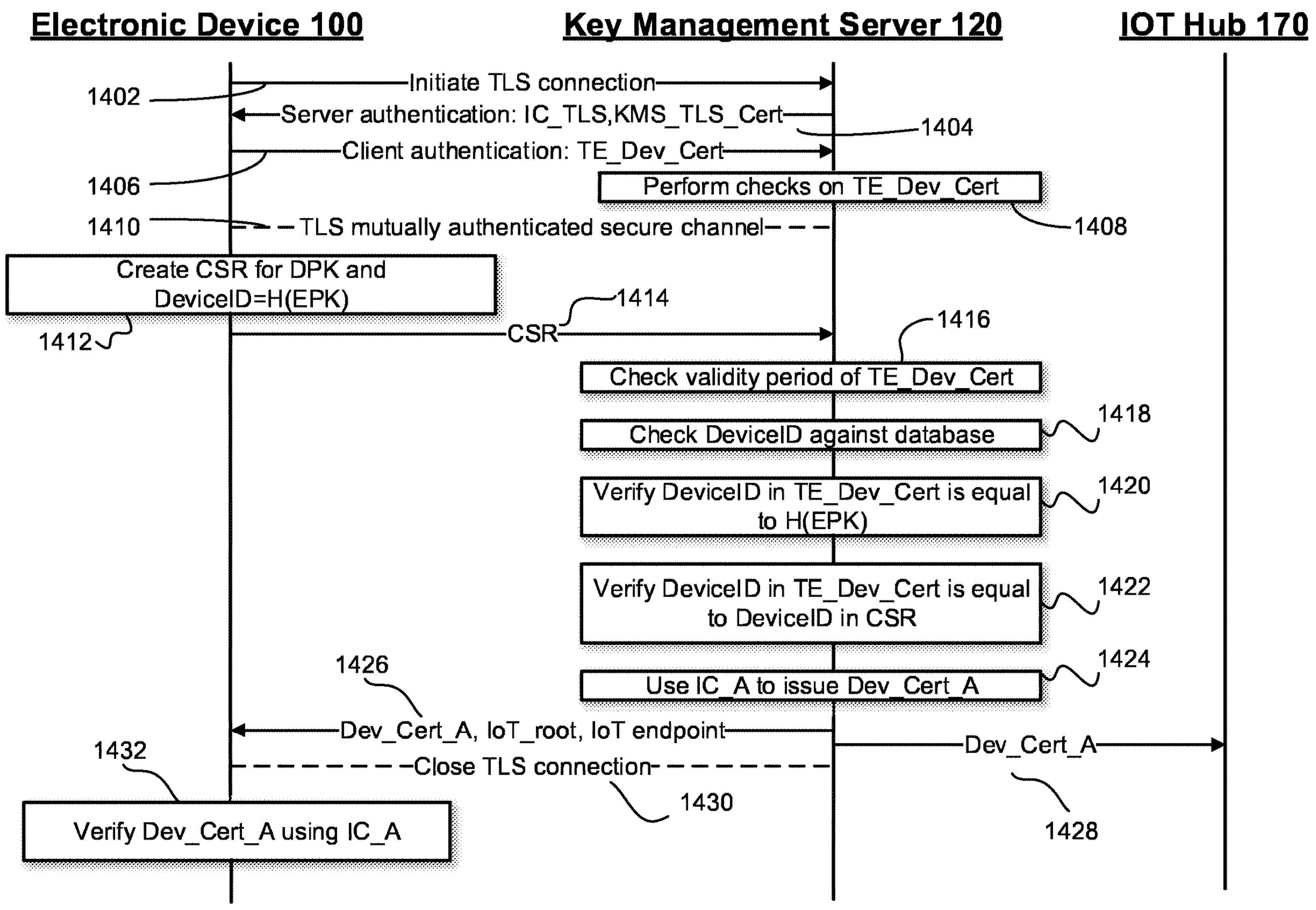
FIG. 10 shows a swimlane flowchart of a method for providing a device certificate to an electronic device.

FIG. 10 illustrates a method for enrolling an electronic device 100. The electronic device 100 includes a security module 110 having a physical unclonable function (PUF) 450. The security module 110 is configured to establish an enrolment key pair (EPK, ESK) based on a first challenge and response to the PUF, the enrolment key pair comprising an enrolment public key (EPK) and an enrolment secret key (ESK). In an example, the security module 110 may be configured to establish the enrolment public key (EPK) based on a first challenge to the PUF 450, and the enrolment secret key (ESK) based on a response to the first challenge to the PUF 450. The electronic device 100 is further configured to establish a device key pair (DPK, DSK) based on a second challenge and response to the PUF, the device key pair comprising a device public key (DPK) and a device secret key (DSK). The electronic device 100 further comprises one or more memories having installed thereon a primary trusted root certificate 1044 (for example, "OEM_ROOT" in FIG. 6C).

In this method, the electronic device 100 and KMS 120 mutually authenticate each other, and the electronic device 100 requests a certificate for a device public key (DPK) that they will use to communicate with their IoT hub 170.

The electronic device 100 initiates, at 1402, a TLS connection to the KMS 120. During the handshake, the KMS 120 again authenticates to the electronic device 100 by presenting (at 1404) the secure connection certificate ("KMS_TLS_Cert") 1056 and secure connection issuing certificate ("IC_TLS") 1054.

The electronic device 100 must perform all checks on this certificate—in particular carefully checking the subject name—as described above in relation to FIG. 7. This proves to the electronic device 100 that it is talking to the KMS 120 associated to the KMS identifier in their firmware.

If the KMS authentication succeeds then the electronic device 100 authenticates to the server by presenting, at 1406, its temporary enrolment device certificate 1046, which it received in a previous exchange, and performing TLS client authentication. The KMS 120 only accepts temporary enrolment device certificates that have been signed by the temporary enrolment issuing certificate 1040 ("TE_OEM_IC"). At 1408, the KMS 120 performs checks on the temporary enrolment device certificate.

Client authentication succeeding proves that the electronic device 100 knows the enrolment secret key (ESK) corresponding to the enrolment public key (EPK) in the temporary enrolment device certificate 1042. Since checks by the KMS 120 when issuing certificates ensure that the device identifiers correspond to devices they own, and the enrolment public key in the temporary enrolment device certificate 1042 hashes to the device identifier named in that certificate, then provided no pair of devices have colliding IDs and an attacker wasn't able to find a collision in the hash function (both events that occur with very small probability), this proves to the KMS 120 that the electronic device 100 is the unique device with the identifier given by H(EPK) that knows the ESK corresponding to the EPK in the temporary enrolment device certificate 1042.

If the temporary enrolment signing key is compromised, then an attacker can issue arbitrary certificates for known key pairs that will allow them to successfully complete TLS client authentication to the KMS 120; however, this case will be caught by checks performed by the KMS 120 further below.

With both parties authenticated, a secure TLS communication channel is opened (1410).

The electronic device 100 creates, at 1412, a Certificate Signing Request (CSR) for the device public key, DPK. The subject name in the CSR is equal to the device identifier (labelled "DeviceID" in the figure), which is a cryptographic hash of the EPK, H(EPK). The electronic device 100 sends the CSR, at 1414, to the KMS 120.

The proof of possession in the CSR gives some assurance to the KMS 120 that the electronic device 100 knows the device secret key (DSK) corresponding to the device public key (DPK) in the CSR. If channel binding information can be included under the CSR in the future, then this will prove that the electronic device 100 at the client end of the TLS connection knows the DSK corresponding to the DPK.

After receiving the CSR, the KMS 120 performs a number of checks.

The KMS 120 checks, at 1416, that the temporary enrolment device certificate 1042 is within its validity period and that the signature used to sign the temporary enrolment device certificate 1042 verifies correctly.

The KMS 120 further checks, at 1418, that the device identifier in the temporary enrolment device certificate 1042 corresponds to an entry in the KMS's database. This mitigates against compromise of the TE issuing secret key (associated with the TE_OEM_IC certificate 1040). If such an event occurs, an attacker can issue arbitrary valid temporary enrolment device certificates 1042. However, temporary enrolment device certificates for device identifiers lying outside the set owned by the KMS will be rejected following this check. This means an attacker can only issue malicious temporary enrolment device certificates for device identifiers owned by the KMS; this is mitigated in the following check.

The KMS 120 checks, at 1420, that the device identifier in the temporary enrolment device certificate 1042 is equal to H(EPK), where EPK is in the public key field of the temporary enrolment device certificate 1042.

Any malicious certificate must have an EPK which hashes to the device identifier in the temporary enrolment device certificate (which, by the previous check, corresponds to a device identifier belonging to the KMS). For TLS client authentication to have succeeded with such a certificate, an attacker must either have compromised the device's ESK (in which case the device is completely compromised anyway), or have found a collision in the hash function meaning a public key other than EPK can be used in the temporary enrolment device certificate 1042 (infeasible for a good collision resistant hash function).

Note, the checks at 1416, 1418, 1420 could optionally be performed at 1408 before the secure channel is opened.

The KMS checks, at 1422, that the device identifier in the temporary enrolment device certificate 1042 is equal to the device identifier in the CSR. Checking that the subject name in the CSR matches that in the temporary enrolment device certificate 1042 is required to link the identity of the authenticating electronic device 100 to that of the issued certificate. This is to prevent an electronic device 100 requesting a certificate for a different device identifier and using the certificate to impersonate that different device.

At 1424, the KMS 120 retrieves the security policy associated to the given device identifier from its database and performs all necessary checks based on certificate lifespan, key usage, etc. to ensure the details in the CSR comply to the KMS's security policy.

If all checks are successful, the KMS 120 uses the secret key of the issuing certificate 1046 ("IC_A") associated to the policy to issue a device certificate 1048 to the electronic device 100 according to the details in the CSR.

The newly created device certificate 1048 is sent, at 1426, to the electronic device 100, along with the IoT hub endpoint and IoT root certificate. The device certificate 1048 is also sent to the IoT hub 170. The electronic device 100 now has all the information required to connect to their IoT hub 170.

For the electronic device 100 to be able to authenticate to their IoT hub 170, the issuing certificate 1046 that signed the device certificate 1048 must have previously been registered with the IoT hub 170. All device issuing certificates IC_A, IC_B, etc. are registered with the IoT hub 170 prior to electronic devices connecting.

At 1430, the TLS connection is terminated.

At 1432, the electronic device 100 uses the issuing certificate IC_A 1046 installed previously to verify the device certificate 1048 it has been sent. The electronic device 100 checks that the device certificate 1048 was issued by the issuing certificate 1046 which was previously installed; it must not accept a device certificate issued by any other certificate.

The electronic device 100 checks that the subject name and public key of the device certificate 1048 are as expected (that is, that the subject is the device identifier H(EPK) and that the public key is DPK). For further security, the electronic device 100 should check where possible that the valid-from and valid-to dates do not display irregularities (such as the valid-from date being in the past, or the device certificate 1048 being expired). If the certificate 1048 has been renewed (so the public key is unchanged) the electronic device 100 could, for example, check that the valid-from date is different to that in its previous certificate to give some assurance that an attacker impersonating the KMS 120 has not returned the electronic device's old certificate to it.

The electronic device 100 must terminate the connection, and optionally raise an error message giving details, if the verification fails.

This step is used to ensure that the electronic device 100 has been issued a valid device certificate 1048 by the now trusted issuing certificate IC_A 1046, and that the details are as the electronic device 100 expects. If an attacker has compromised the TLS key (for the KMS_TLS_Cert certificate 1056) but not the issuing secret key (for the IC_A certificate 1046), they will be able to impersonate the KMS 120 to the electronic device 100 but will not be able to issue a valid new device certificate 1048 for the electronic device 100. The electronic device 100 should carefully check the details of the received certificate, both to ensure they have received a suitable certificate, and to detect if an attacker impersonating the KMS 120 but without knowledge of the issuing secret is trying to trick the electronic device 100 into accepting an already-issued device certificate.

Advantageously, after the method of FIG. 10, the electronic device is in possession of a valid device certificate 1048 for certifying that the device public key (DPK) is associated with the device identifier (H(EPK)). Trust in the device certificate 1048 is derived from the primary root certificate 1044 associated with the OEM 160.

Figure 11:
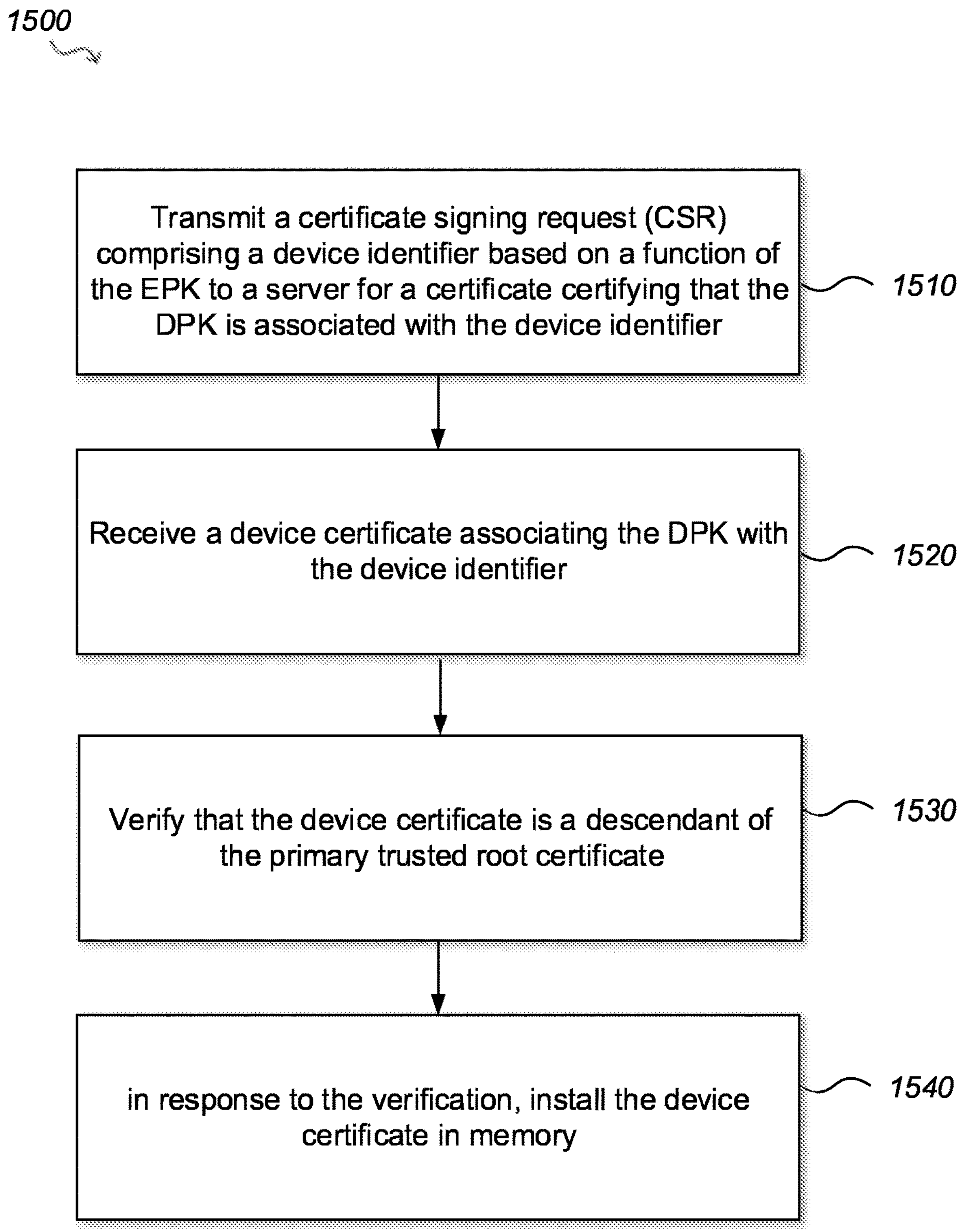
FIG. 11 shows a flowchart.

FIG. 11 shows a flowchart of a general method 1500 for performance by an electronic device 100. The electronic device comprises 100 a security module 110 having a physical unclonable function (PUF) 450. The security module 110 is configured to establish an enrolment key pair (EPK, ESK) based on a first challenge and response to the PUF, the enrolment key pair comprising an enrolment public key (EPK) and an enrolment secret key (ESK). In an example, the security module 110 may be configured to establish the enrolment public key (EPK) based on a first challenge to the PUF 450, and the enrolment secret key (ESK) based on a response to the first challenge to the PUF. The electronic device 100 is configured to establish a device key pair (DPK, DSK) based on a first challenge and response to the PUF, the device key pair comprising a device public key (DPK) and a device secret key (DSK). The electronic device 100 further comprises one or more memories having installed thereon a primary trusted root certificate 1044.

At 1510, the method 1500 comprises over a secure connection, transmitting a certificate signing request (CSR) to a server for a certificate 1048 certifying that the DPK is associated with a device identifier, wherein the CSR is signed using the DSK. The CSR comprises the DPK and the device identifier. The device identifier is based on a function of the EPK.

At 1520, the method 1500 comprises, over the secure connection, receiving a device certificate 1048 associating the DPK with the device identifier.

At 1530, the method 1500 comprises verifying that the device certificate 1048 is a descendant of the primary trusted root certificate 1044. The electronic device 100 may further check that the subject name and public key of the device certificate 1048 are as expected (that is, that the subject is the device identifier H(EPK) and that the public key is DPK). For further security, the electronic device 100 may check that the valid-from and valid-to dates do not display irregularities (such as the valid-from date being in the past, or the device certificate 1048 being expired). If the certificate 1048 has been renewed (so the public key is unchanged) the electronic device 100 may check that the valid-from date is different to that in its previous certificate to give some assurance that an attacker has not returned the electronic device's old certificate to it.

At 1540, the method 1500 comprises, in response to the verification, installing the device certificate 1048 in memory.

Figure 12:
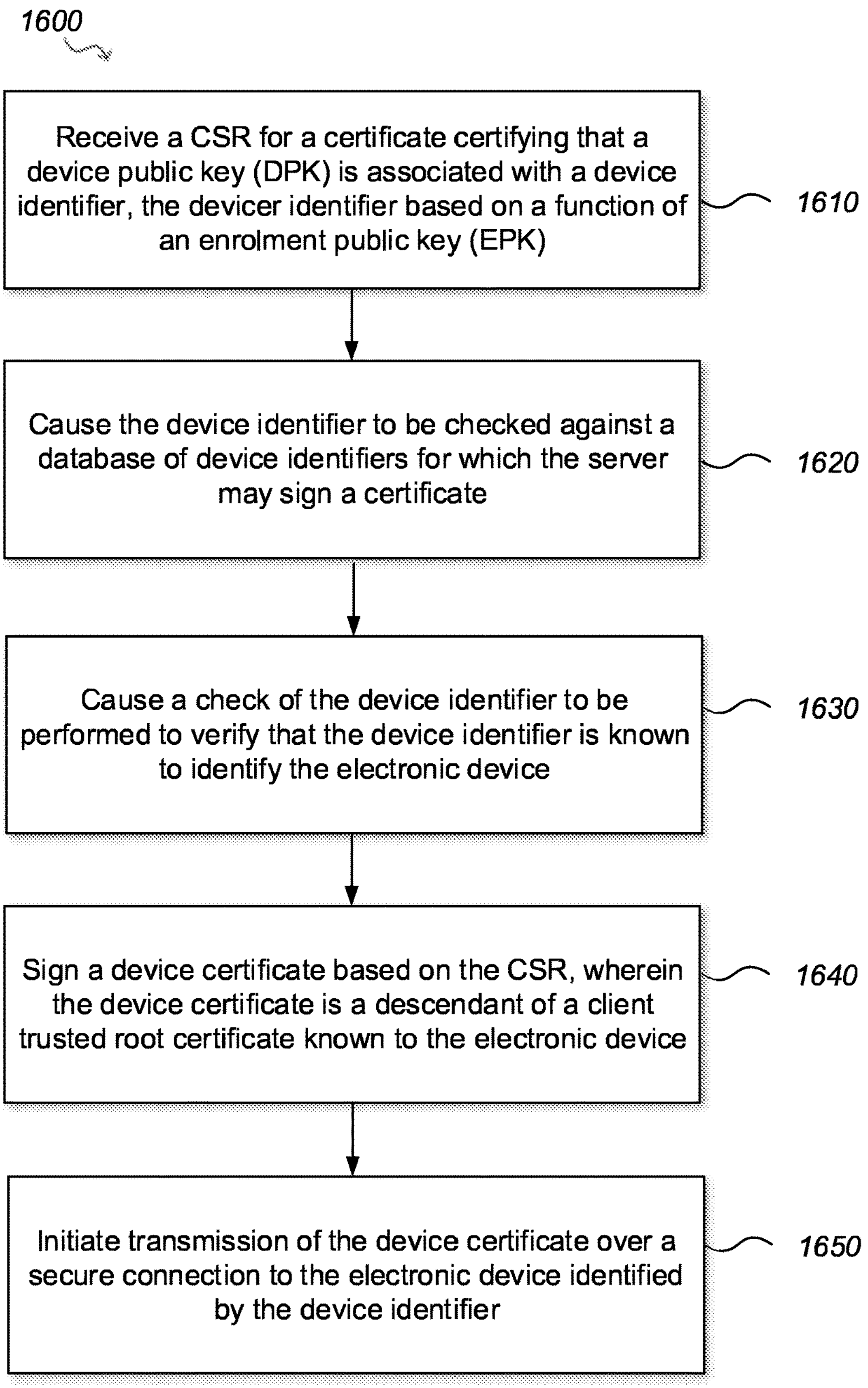
FIG. 12 shows a flowchart.

FIG. 12 shows a flowchart of a method 1600. The method is suitable for performance by computing apparatus such as key management server 120, which may comprise one or more computing apparatuses (i.e. a key management server system).

At 1610, the method 1600 comprises receiving a certificate signing request (CSR) for a certificate certifying that a device public key (DPK) of a device key pair is associated with a device identifier. The CSR comprises the device identifier and the DPK and is signed using a device secret key (DSK) of the device key pair. The device identifier is based on a function of an enrolment public key of an enrolment key pair known to belong to the electronic device.

The KMS 120 may receive the CSR over a secure connection from the electronic device 100 or may receive the CSR from another server of the key management server system which received the CSR over a secure connection from the electronic device 100.

At 1620, the method 1600 comprises causing the device identifier to be checked against a database of device identifiers for which the server may sign a certificate. For example, the database may be stored locally in which case the database may be directly consulted, as envisaged in the scenario described with respect to FIG. 10. However, in other examples, the database may be located in a remote server, for example with an authority server 130, in which case a request may be made to check the device identifier against the database.

At 1630, the method 1600 comprises causing a check of the device identifier to be performed to verify that the device identifier is known to identify the electronic device. For example, a KMS 120 may cause a check to be performed to verify that the KMS 120 owns the device identifier, that the device identifier is a function of the EPK, and that the device identifier of the CSR is equal to the device identifier in a previously issued temporary enrolment device certificate 1042.

At 1640, the method 1600 comprises signing a device certificate 1048 based on the CSR, wherein the device certificate 1048 is a descendant of a primary trusted root certificate known to the electronic device.

At 1650, the method comprises initiating transmission of the device certificate 1048 over a secure connection to the electronic device identified by the device identifier. The method may further comprise initiating transmission of an IoT root certificate of an IoT hub, and an endpoint such as a URL to enable the electronic device to communicate with the associated IoT hub. The method may further comprise communicating the device certificate 1048 to the IoT hub 170.

Figure 13:
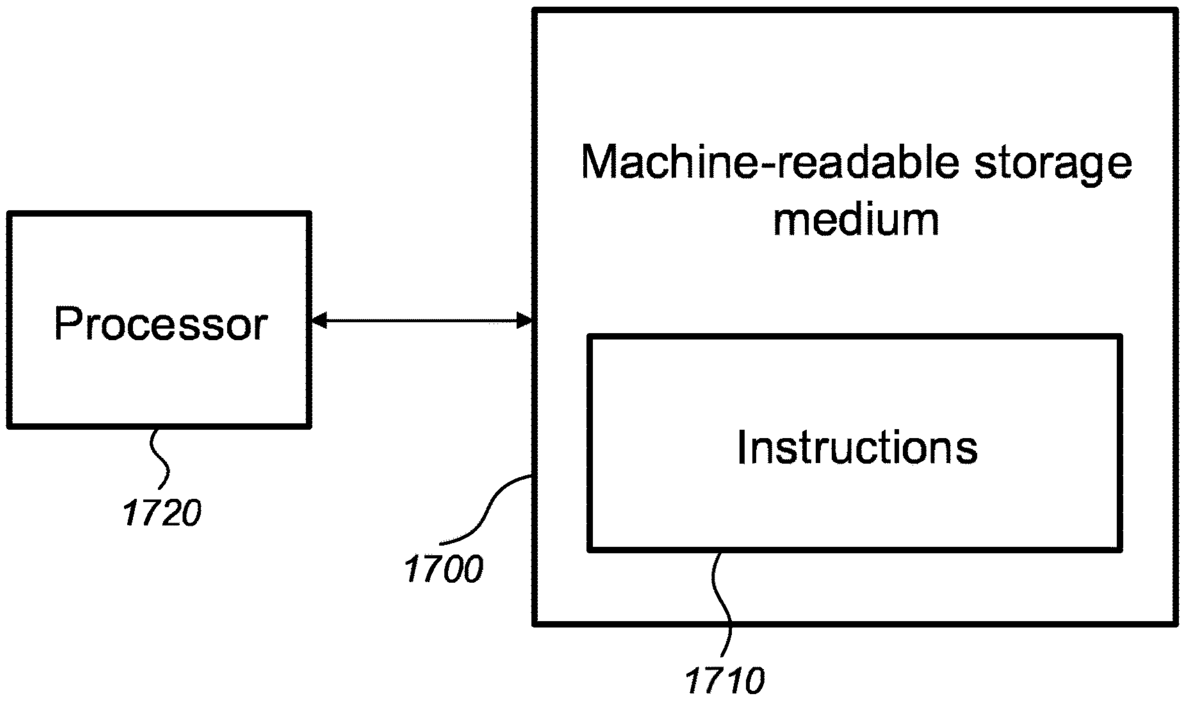
FIG. 13 shows a block diagram of a computer readable medium.

FIG. 13 illustrates a computer readable medium 1700 according to some examples.

The computer readable medium 1700 stores units, with each unit including instructions 1710 that, when executed, cause a processor 1720 or other processing/computing device or apparatus to perform particular operations.

For example, the instructions 1710 may cause a processor 1720 to, over a secure connection, transmit a certificate signing request (CSR) comprising a device identifier and an enrolment public key, EPK, to a server for a certificate certifying that the EPK is associated with the device identifier, wherein the CSR is signed using an enrolment secret key, ESK, and wherein the device identifier is based on a function of the EPK. The instructions 1710 may further cause a processor 1720 to, over the secure connection, receive a temporary enrolment device certificate certifying that the EPK is associated with the device identifier and including a validity period. The instructions 1710 may further cause a processor 1720 to install the temporary enrolment device certificate in memory.

For example, the instructions 1710 may cause a processor 1720 to receive a certificate signing request (CSR) comprising a device identifier and an enrolment public key (EPK) of an enrolment key pair established by an electronic device for a certificate certifying that the EPK is associated with the device identifier, wherein the device identifier is based on a function of the EPK. The instructions 1710 may further cause the processor 1720 to cause the device identifier to be checked against a database of device identifiers for which the server may sign a certificate. The instructions 1710 may further cause the processor 1720 to cause a check of the device identifier to be performed to verify the device identifier is a function of the EPK. The instructions 1710 may further cause the processor 1720 to cause the EPK to be associated with the device identifier in the database. The instructions 1710 may further cause the processor 1720 to sign a temporary enrolment device certificate certifying that the EPK is associated with the device identifier and including a validity period. The instructions 1710 may further cause the processor 1720 to initiate transmission of the signed temporary enrolment device certificate over a secure connection to the electronic device identified by the device identifier.

For example, the instructions 1710 may cause a processor 1720 to, over a secure connection, transmit a certificate signing request (CSR) for a device public key (DPK) comprising a device identifier based on a function of an enrolment public key (EPK) to a server for a certificate certifying that the DPK is associated with the device identifier, wherein the CSR is signed using a device secret key (DSK). The instructions 1710 may further cause the processor 1720 to, over the secure connection, receive a device certificate associating the DPK with the device identifier. The instructions 1710 may further cause the processor 1720 to verify that the device certificate is a descendant of the primary trusted root certificate. The instructions 1710 may further cause the processor 1720 to, in response to the verification, install the device certificate in memory.

For example, the instructions 1710 may cause a processor 1720 to receive a certificate signing request (CSR) for a device public key (DPK) of a device key pair established by an electronic device, the CSR comprising a device identifier based on a function of an enrolment public key (EPK) of an enrolment key pair established by the electronic device, the CSR for a certificate certifying that the DPK is associated with the device identifier. The instructions 1710 may further cause the processor 1720 to cause the device identifier to be checked against a database of device identifiers for which the processor 1720 may sign a certificate. The instructions 1710 may further cause the processor 1720 to cause a check of the device identifier to be performed to verify that the device identifier is known to identify the electronic device. The instructions 1710 may further cause the processor 1720 to sign a device certificate based on the CSR, wherein the device certificate is a descendant of a primary trusted root certificate. The instructions 1710 may further cause the processor 1720 to initiate transmission of the device certificate over a secure connection to the electronic device identified by the device identifier.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Many variations of the methods described herein will be apparent to the skilled person.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An electronic device comprising a security module having a physical unclonable function (PUF), the security module configured to establish an enrolment key pair (EPK, ESK) based on a first challenge and response to the PUF, the enrolment key pair comprising an enrolment public key (EPK) and an enrolment secret key (ESK); wherein the electronic device is configured to establish a device key pair (DPK, DSK) based on a second challenge and response to the PUF, the device key pair comprising a device public key (DPK) and a device secret key (DSK); the electronic device further comprising:

one or more memories having installed thereon a primary trusted root certificate; and a processor configured to:

receive a secure connection issuing certificate and a secure connection certificate from a server, the secure connection issuing certificate and secure connection certificate being descendants of the primary trusted root certificate;

verify the secure connection certificate using the primary trusted root certificate;

in response to the verification, establish a secure connection to the server;

over the secure connection, transmit a certificate signing request (CSR) to the server for a certificate certifying that the DPKis associated with a device identifier, the CSR comprising:

the device identifier, and the DPK, wherein the CSR is signed using the DSK, and wherein the device identifier is based on a function of the EPK;

over the secure connection, receive a device certificate associating the DPK with the device identifier;

verify that the device certificate is a descendant of the primary trusted root certificate; and in response to the verification, install the device certificate in memory.

2. An electronic device according to claim 1, wherein the processor is further configured to, over the secure connection, receive an IoT hub root certificate and store the IoT hub root certificate in memory.

3. An electronic device according to claim 2, wherein the processor is further configured to, over the secure connection, receive an IoT hub endpoint and store the IoT hub endpoint in memory.

4. An electronic device according to claim 1, wherein the one or more memories have installed thereon an issuing certificate, wherein the issuing certificate is a descendant of the primary trusted root certificate, and wherein verifying that the device certificate is a descendant of the primary trusted root certificate comprises verifying that the device certificate is a direct descendant of the issuing certificate.

5. An electronic device according to claim 4, wherein the issuing certificate is a direct descendant of the primary trusted root certificate.

6. An electronic device according to claim 1, wherein the one or more memories have installed thereon a temporary enrolment device certificate, wherein the temporary enrolment device certificate associates the EPK with the device identifier and includes a validity period, and wherein the secure connection is established before expiration of the validity period.

7. An electronic device according to claim 6, wherein to establish the secure connection with the server, the processor is configured to authenticate with the server by presenting the temporary enrolment device certificate.

8. An electronic device according to claim 7, wherein the temporary enrolment device certificate is signed by a temporary enrolment issuing certificate stored in the server.

9. An electronic device according to claim 1, wherein verifying the secure connection certificate comprises verifying the secure connection certificate is a descendant of the primary trusted root certificate and, optionally, comparing the server identity to a server identity stored in the one or more memories of the electronic device.

10. A method for performance by an electronic device, the electronic device comprising: a security module having a physical unclonable function (PUF), the security module configured to establish an enrolment key pair (EPK, ESK) based on a first challenge and response to the PUF, the enrolment key pair comprising an enrolment public key (EPK) and an enrolment secret key (ESK); and one or more memories having installed thereon a primary trusted root certificate; and wherein the electronic device is configured to establish a device key pair (DPK,DSK) based on a second challenge and response to the PUF, the device key pair comprising a device public key (DPK) and a device secret key (DSK); wherein the method comprises:

receiving a secure connection issuing certificate and a secure connection certificate from a server, the secure connection issuing certificate and secure connection certificate being descendants of the primary trusted root certificate;

verifying the secure connection certificate using the primary trusted root certificate;

in response to the verification, establishing a secure connection to the server;

over the secure connection, transmitting a certificate signing request (CSR) to the server for a certificate certifying that the DPK is associated with a device identifier, the CSR comprising:

the device identifier, and the DPK, wherein the CSR is signed using the DSK, and wherein the device identifier is based on a function of the EPK;

over the secure connection, receiving a device certificate associating the DPK with the device identifier;

verifying that the device certificate is a descendant of the primary trusted root certificate; and in response to the verification, installing the device certificate in memory.

11. A non-transitory computer readable medium comprising instructions which, when executed by a processor of an electronic device, cause the electronic device to perform a method according to claim 10.

12. A server of a server system comprising one or more servers, the server system for authenticating an electronic device, the server configured to:

initiate transmission of a secure connection issuing certificate and a secure connection certificate from the server system to the electronic device, the secure connection issuing certificate and secure connection certificate being descendants of a primary trusted root certificate known to the electronic device;

receive a certificate signing request (CSR) for a certificate certifying that a device public key (DPK) of a device key pair is associated with a device identifier for identifying an electronic device, the CSR comprising:

the device identifier, and the DPK, wherein the CSR is signed using a device secret key (DSK) of the device key pair, and wherein the device identifier is based on a function of an enrolment public key (EPK) of an enrolment key pair known to belong to the electronic device;

cause the device identifier of the CSR to be checked against a database of device identifiers for which the server may sign a certificate;

cause a check of the device identifier of the CSR to be performed to verify that the device identifier is known to identify the electronic device by verifying that the device identifier of the CSR matches the device identifier of a temporary enrolment device certificate, the temporary enrolment device certificate certifying that the EPK is associated with the device identifier and including a validity period, the temporary enrolment device certificate having been presented by the electronic device to the server system when establishing a secure connection;

sign a device certificate based on the CSR, wherein the device certificate is a descendant of a primary trusted root certificate known to the electronic device;

initiate transmission of the device certificate from the server system over a secure connection to the electronic device identified by the device identifier.

13. A server according to claim 12, the server further configured to initiate transmission of a IoT hub root certificate over the secure connection from the server system to the electronic device and/or to initiate transmission of a ToT hub endpoint over the secure connection to the electronic device.

14. A server according to claim 12, the server further configured to cause the registration of the device certificate to an IoT hub.

15. A server according to claim 12, the server further configured to cause the retrieval of a security policy associated with the device identifier and to cause the signing of the device certificate according to the CSR and security policy.

16. A server according to claim 12, the server further configured to cause the checking that the temporary enrolment device certificate is signed by a temporary enrolment issuing certificate stored in the server system and the checking that the temporary enrolment device certificate is in the validity period.

17. A server according to claim 16, the server further configured to establish the secure connection between the electronic device and the server system based on the checking of the signature of the temporary enrolment device certificate.

18. A method comprising:

initiating transmission of a secure connection issuing certificate and a secure connection certificate from the server system to the electronic device, the secure connection issuing certificate and secure connection certificate being descendants of a primary trusted root certificate known to the electronic device;

receiving a certificate signing request (CSR) for a certificate certifying that a device public key (DPK) of a device key pair is associated with a device identifier for identifying an electronic device, the CSR comprising the device identifier, and the DPK, wherein the CSR is signed using a device secret key (DSK) of the device key pair, and wherein the device identifier is based on a function of an enrolment public key (EPK) of an enrolment key pair known to belong to the electronic device;

causing the device identifier to be checked against a database of device identifiers for which the server may sign a certificate;

causing a check of the device identifier of the CSR to be performed to verify that the device identifier is known to identify the electronic device by verifying that the device identifier of the CSR matches the device identifier of a temporary enrolment device certificate, the temporary enrolment device certificate certifying that the EPK is associated with the device identifier and including a validity period, the temporary enrolment device certificate having been presented by the electronic device to the server system when establishing a secure connection;

signing a device certificate based on the CSR, wherein the device certificate is a descendant of a primary trusted root certificate known to the electronic device; and initiating transmission of the device certificate over a secure connection to the electronic device identified by the device identifier.

19. A non-transitory computer readable medium comprising instructions which, when executed by a processor of a server, cause the server to perform a method according to claim 18.

20. A system comprising an electronic device and one or more servers: wherein the electronic device comprises a security module having a physical unclonable function (PUF), the security module configured to establish an enrolment key pair (EPK, ESK) based on a first challenge and response to the PUF, the enrolment key pair comprising an enrolment public key (EPK) and an enrolment secret key (ESK); wherein the electronic device is configured to establish a device key pair (DPK,DSK) based on a second challenge and response to the PUF, the device key pair comprising a device public key (DPK) and a device secret key (DSK); the electronic device further comprising: one or more memories having installed thereon a primary trusted root certificate; and a processor configured to: over a secure connection, transmit a certificate signing request (CSR) to the one or more servers for a certificate certifying that the DPK is associated with a device identifier, the CSR comprising: the device identifier; and the DPK; wherein the CSR is signed using the DSK, and wherein the device identifier is based on a function of the EPK; over the secure connection, receive a device certificate associating the DPK with the device identifier; verify that the device certificate is a descendant of the primary trusted root certificate; and in response to the verification, install the device certificate in memory; and wherein the one or more servers are configured to: receive the CSR over the secure connection from the electronic device; check the device identifier against a database of device identifiers for which the server may sign a certificate; verify that the device identifier is known to identify the electronic device; sign the device certificate based on the CSR, wherein the device certificate is a descendant of the primary trusted root certificate; send the device certificate over the secure connection to the electronic device identified by the device identifier.

* * * * *